United States Patent
Snyder et al.

(10) Patent No.: US 11,760,158 B2
(45) Date of Patent: Sep. 19, 2023

(54) VENT COVERS FOR RECREATIONAL VEHICLE DUCTWORK

(71) Applicant: Thor Tech, Inc., Elkhart, IN (US)

(72) Inventors: Jeff Snyder, White Pigeon, MI (US); Jon Brock, Warsaw, IN (US); Mark Bullock, Elkhart, IN (US); Charles Retallack, Phoenix, AZ (US); Don Battles, Jr., Goshen, IN (US)

(73) Assignee: Keystone RV Company, Goshen, IN (US)

( * ) Notice: Subject to any disclaimer, the term of this patent is extended or adjusted under 35 U.S.C. 154(b) by 75 days.

(21) Appl. No.: 17/064,204

(22) Filed: Oct. 6, 2020

(65) Prior Publication Data

US 2021/0101443 A1    Apr. 8, 2021

Related U.S. Application Data

(60) Provisional application No. 62/911,566, filed on Oct. 7, 2019.

(51) Int. Cl.
*B60H 1/00*    (2006.01)
*F24F 13/08*   (2006.01)
*F24F 13/06*   (2006.01)

(52) U.S. Cl.
CPC ..... *B60H 1/00664* (2013.01); *B60H 1/00564* (2013.01); *F24F 13/06* (2013.01); *F24F 13/08* (2013.01)

(58) Field of Classification Search
CPC .... B60H 1/34; B60H 1/3407; B60H 1/00664; B60H 1/00371; B60H 1/00564;

(Continued)

(56) References Cited

U.S. PATENT DOCUMENTS

| 4,352,323 A | 10/1982 | Burkarth |
| 5,531,641 A * | 7/1996 | Aldrich .............. B60H 1/00364 454/232 |

(Continued)

FOREIGN PATENT DOCUMENTS

| CN | 106885316 A * | 6/2017 | ................ F24F 1/38 |
| EP | 0700801 A1 | 3/1996 | |

(Continued)

OTHER PUBLICATIONS

English Translation of FR-3045504-A1, dated Jul. 1, 2022 (Year: 2022).*

(Continued)

*Primary Examiner* — Edelmira Bosques
*Assistant Examiner* — Brett Peterson Mallon
(74) *Attorney, Agent, or Firm* — Dinsmore & Shohl LLP

(57) ABSTRACT

A diffusing vent assembly may include a diffuser base and a diffusing head. The diffuser base may include a mounting flange, a collar extending from the mounting flange, and a ductwork fixation channel. The collar may span an infra-ceiling space of a vehicle. The diffusing head may include a diffuser vane configuration, a rotational flange surrounding the diffuser vane configuration, and an air blade. The diffuser base and the diffusing head further comprise complementary rotational securement members that permit rotation of the diffusing head relative to the diffuser base. The air blade may extend through the collar of the diffuser base. Installing the diffusing vent assembly may include engaging the ductwork fixation channel with a supply duct, inserting the diffusing head into the diffuser base, and securing the diffusing head and the diffuser base using the complimentary rotational securement members.

24 Claims, 28 Drawing Sheets

(58) Field of Classification Search
CPC .... B60H 1/247; B60H 1/262; B60H 1/00871; B60H 2001/00235; B60H 1/00364; B60H 1/241; B60H 1/26; F24F 13/08; F24F 13/0209; F24F 13/065; F24F 13/068; F24F 13/06; F24F 2013/0608; F24F 7/10
See application file for complete search history.

(56) References Cited

U.S. PATENT DOCUMENTS

| | | | |
|---|---|---|---|
| 6,315,354 | B1 | 11/2001 | Tani et al. |
| 7,618,405 | B2 * | 11/2009 | Young ................ A61J 1/10 220/660 |
| 2014/0011436 | A1 * | 1/2014 | Kaneda |

FOREIGN PATENT DOCUMENTS

| | | | | |
|---|---|---|---|---|
| FR | 3045504 A1 * | 6/2017 | ............... | B60H 1/34 |
| FR | 3045504 A1 | 6/2017 | | |
| JP | 2016088327 A * | 5/2016 | | |
| JP | 2016088327 A | 5/2016 | | |
| WO | WO-2017149442 A1 * | 9/2017 | ......... | B60H 1/00364 |
| WO | WO-2018138573 A1 * | 8/2018 | .............. | F24F 11/74 |

OTHER PUBLICATIONS

English Translation of CN-106885316-A, dated Jul. 1, 2022 (Year: 2022).*
English Translation of JP-2016088327-A, dated Jul. 1, 2022 (Year: 2022).*
PDF Copy of https://www.makeitfrom.com/material-properties/Polybutylene-Terephthalate-PBT/ (Year: 2022).*
PDF Copy of https://www.makeitfrom.com/material-properties/Polypropylene-PP-Copolymer (Year: 2022).*
International Search Report and Written Opinion pertaining to International Application No. PCT/US2020/054469 dated Jan. 28, 2021, 27 pgs.

* cited by examiner

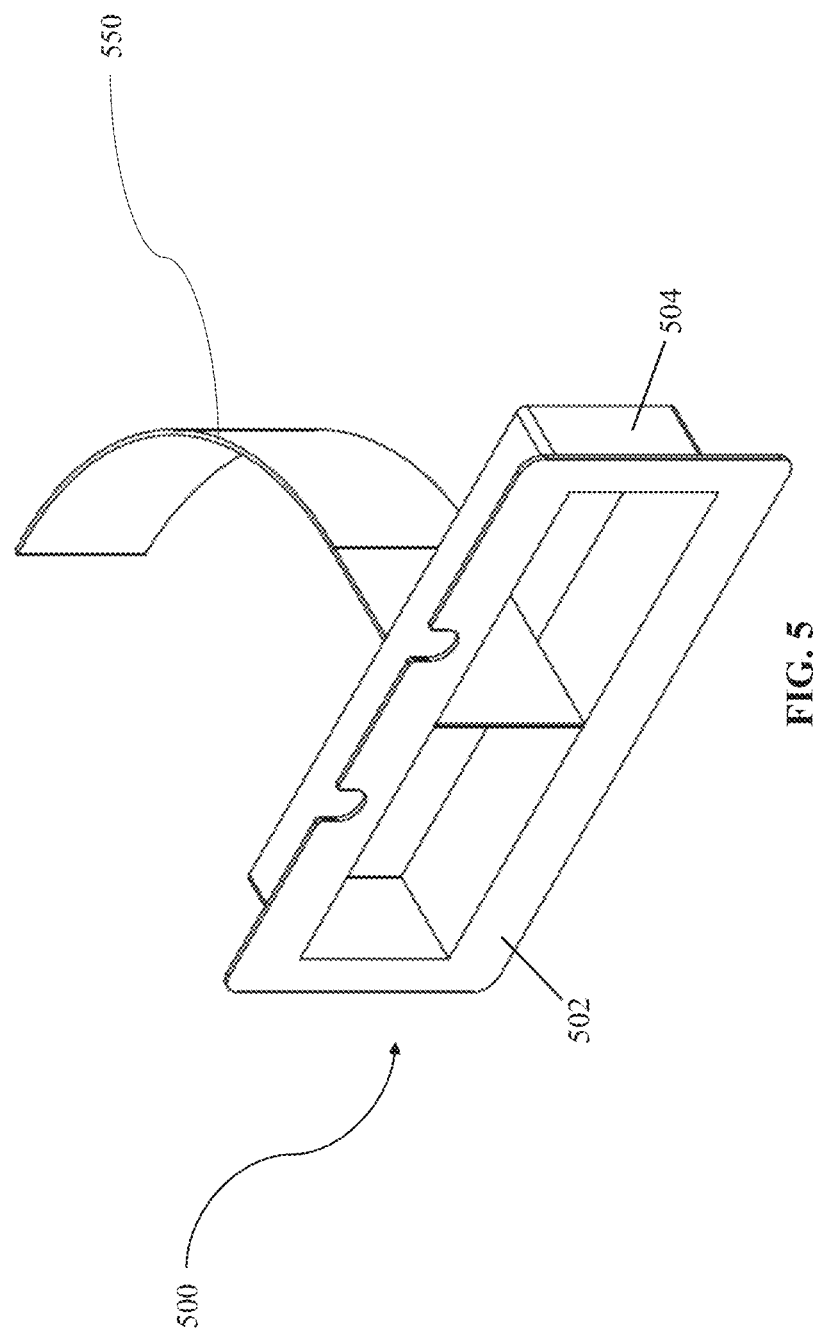

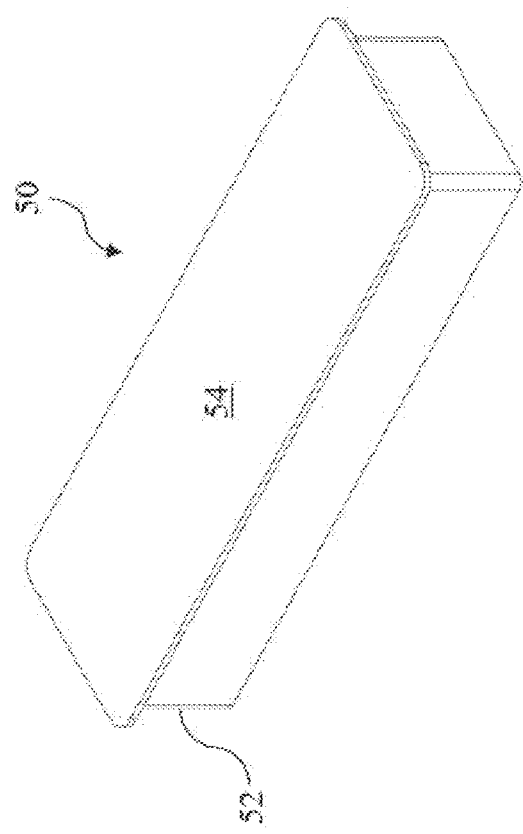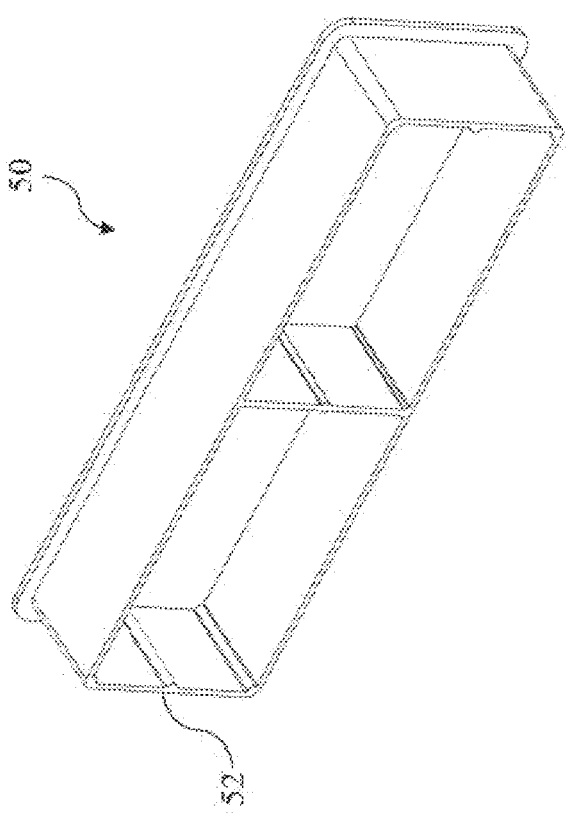
FIG. 9A
FIG. 9B

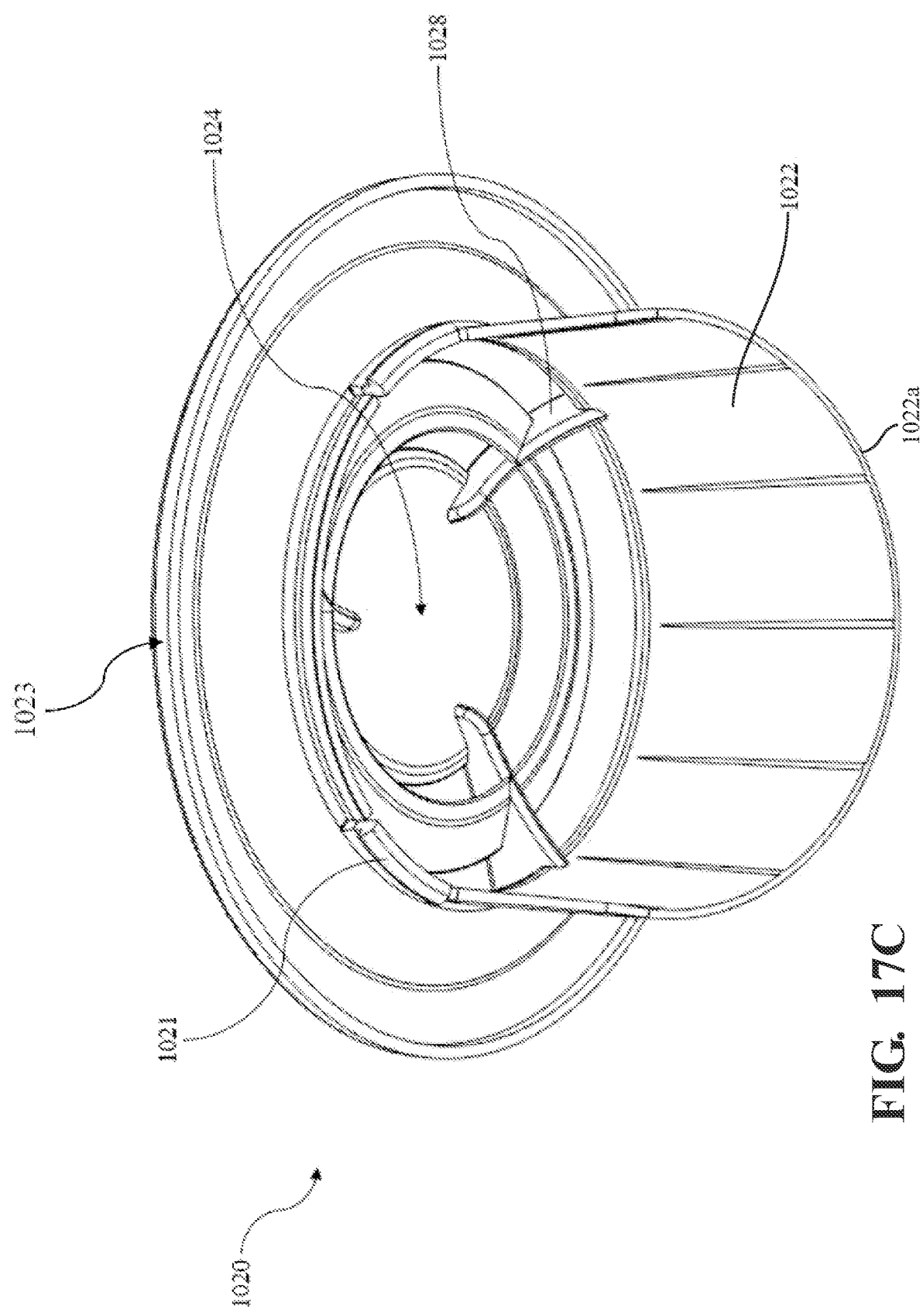

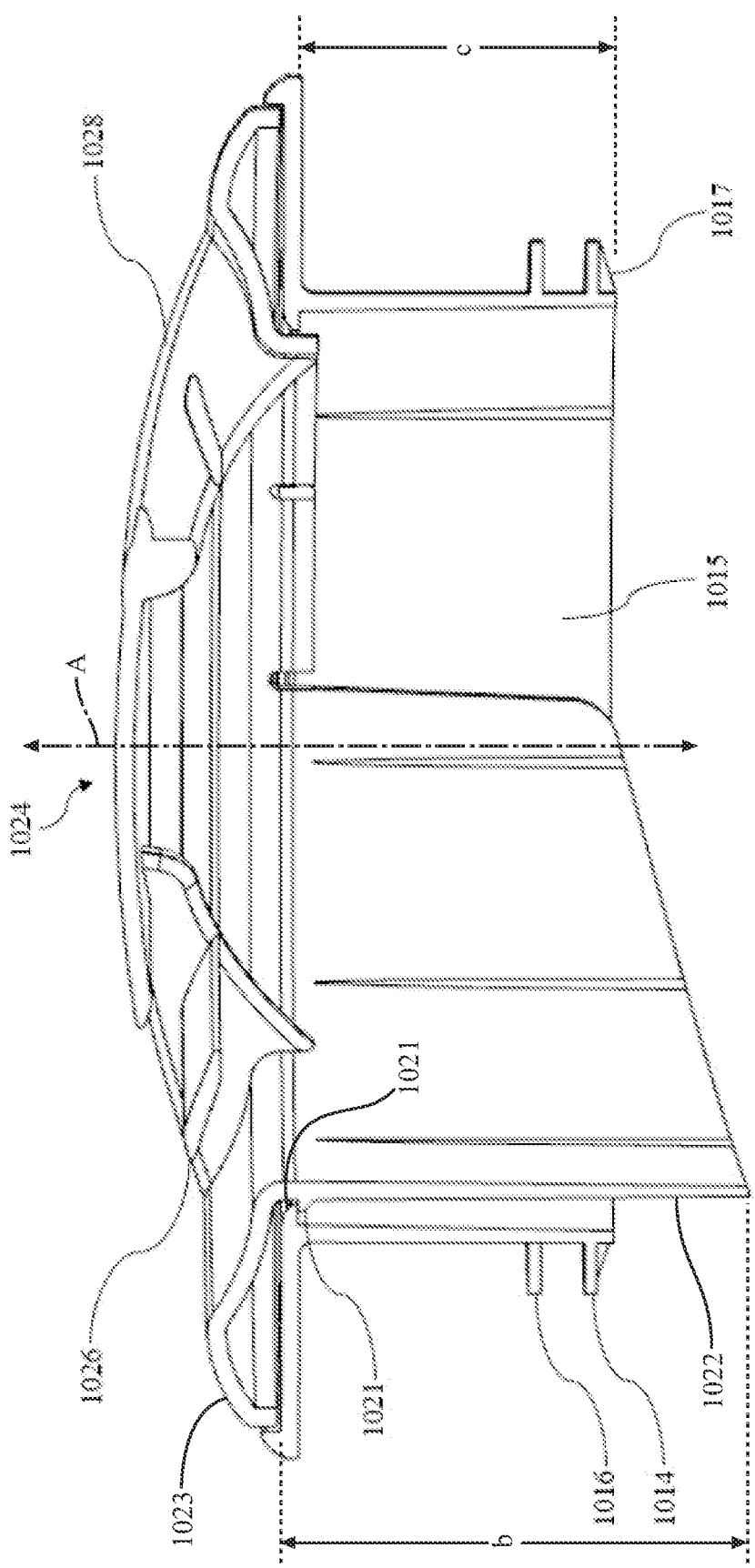

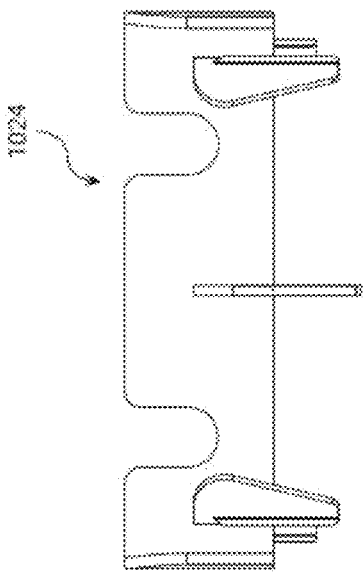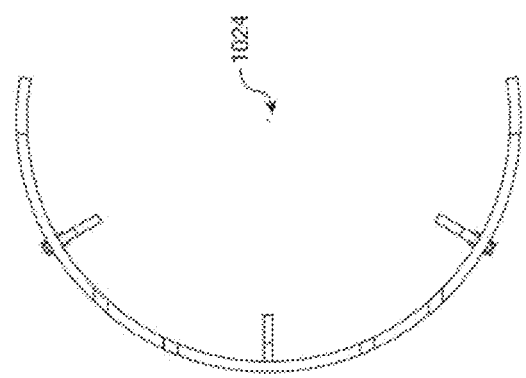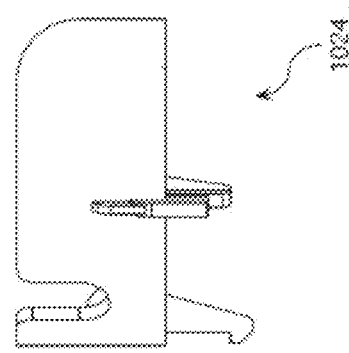

VENT COVERS FOR RECREATIONAL VEHICLE DUCTWORK

CROSS-REFERENCE TO RELATED APPLICATIONS

This application claims the benefit of U.S. Provisional Application Ser. No. 62/911,566, filed Oct. 7, 2019.

BACKGROUND

The present disclosure relates to recreational vehicles, and more particularly, to heating, ventilation, and air conditioning (HVAC) ductwork and diffusing vent assemblies in recreational vehicles.

BRIEF SUMMARY

According to the subject matter of the present disclosure, diffusing vent assemblies are provided for recreational vehicles. Contemplated diffusing vent assemblies may include a diffuser base and a diffusing head that together create optimal distribution and circulation of air from an HVAC system within the interior of a recreational vehicle (RV).

The present inventors have recognized that RVs must endure high temperatures in the summer months and low temperatures in the winter months. In view of this, improved heating and air conditioning systems are desirable such that the air circulation inside the RV provided by an HVAC system enables occupants to stay at a comfortable temperature within the RV.

Air conditioning (AC) units may typically be installed on the roof of an RV with the conditioned air outlet of the AC unit in direct communication with an AC air inlet of the RV ductwork, and the return air inlet of the AC unit in direct communication with a return air vent of the RV ductwork. In the embodiments illustrated herein, conditioned air flows from the AC unit, through the supply duct portion of the RV ductwork, into the interior of the RV. Return air flows into a return air portion of the RV ductwork back to the AC unit. The supply duct forms a network of channels for distributing the conditioned air into the interior of the RV.

In accordance with one embodiment of the present disclosure, a diffusing vent assembly may include a diffuser base and a diffusing head. The diffuser base may include a mounting flange, a collar extending from the mounting flange, and a ductwork fixation channel formed about an outside periphery of the collar. The collar of the diffuser base may define a collar extension length c between the mounting flange and the ductwork fixation channel of the diffuser base. The collar extension length c may be large enough to span an infra-ceiling space of a recreational vehicle. The diffusing head may include a diffuser vane configuration, a rotational flange surrounding the diffuser vane configuration, and an air blade extending from the rotational flange. The air blade may include a terminal edge and defines an air blade extension length b between the rotational flange of the diffusing head and the terminal edge of the air blade. The air blade extension length b may be greater than the collar extension length c. The diffuser base and the diffusing head may further include complementary rotational securement members that permit rotation of the diffusing head relative to the diffuser base about a rotational axis of the diffusing head and fix the diffusing head to the diffuser base along the rotational axis of the diffusing head, with the air blade of the diffusing head extending through the collar of the diffuser base.

In accordance with another embodiment of the present disclosure, a method of installing the diffusing vent assembly may include inserting the collar of the diffuser base through an opening in the ceiling board, inserting at least a portion of the collar of the diffuser base through the opening in the supply duct corresponding to the opening in the ceiling board, engaging the ductwork fixation channel formed about an outside periphery of the collar of the diffuser base with the supply duct such that the ductwork fixation channel complements the opening in the supply duct, inserting the diffusing head into the diffuser base, and securing the diffusing head and the diffuser base together using the complimentary rotational securement members.

In accordance with still another embodiment of the present disclosure, a recreational vehicle comprising supply ductwork and a diffusing vent assembly, the diffusing vent assembly comprising a diffuser base and a diffusing head. The supply ductwork and diffusing vent assembly may be positioned in an infra-ceiling space of the recreational vehicle. The diffusing vent assembly may be in communication with the supply ductwork. The diffuser base may include a mounting flange, a collar extending from the mounting flange, and a ductwork fixation channel formed about an outside periphery of the collar. The collar of the diffuser base may define a collar extension length c between the mounting flange and the ductwork fixation channel of the diffuser base. The collar extension length c may be large enough to span the infra-ceiling space of a recreational vehicle. The diffusing head may include a diffuser vane configuration, a rotational flange surrounding the diffuser vane configuration, and an air blade extending from the rotational flange. The air blade may include a terminal edge and defines an air blade extension length b between the rotational flange of the diffusing head and the terminal edge of the air blade. The air blade extension length b may be greater than the collar extension length c. The diffuser base and the diffusing head may further include complementary rotational securement members that permit rotation of the diffusing head relative to the diffuser base about a rotational axis of the diffusing head and fix the diffusing head to the diffuser base along the rotational axis of the diffusing head, with the air blade of the diffusing head extending through the collar of the diffuser base.

Although the concepts of the present disclosure are described herein with primary reference to recreational vehicles, it is contemplated that the concepts will enjoy applicability to any type of vehicle or any type of HVAC ductwork. For example, and not by way of limitation, it is contemplated that the concepts of the present disclosure will enjoy applicability to all motor vehicles and non-motor vehicles with air conditioning units or other HVAC equipment.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 5 illustrates a further alternative sleeve insert according to the present disclosure;

FIGS. 9A and 9B illustrate a duct plug according to one embodiment of the present disclosure;

FIGS. 17A-17C illustrate a diffusing head of a diffusing vent assembly, according to one embodiment of the present disclosure, from a variety of perspectives;

FIGS. 18A-18B illustrate the diffusing vent assembly of FIG. 11 in unassembled and assembled states, according to one embodiment of the present disclosure, from a cross-sectional perspective; and FIGS. 19-22 illustrate a variety of separate extended air blade portions of contemplated diffusing assemblies according to one embodiment of the present disclosure.

DETAILED DESCRIPTION

Figure 1:
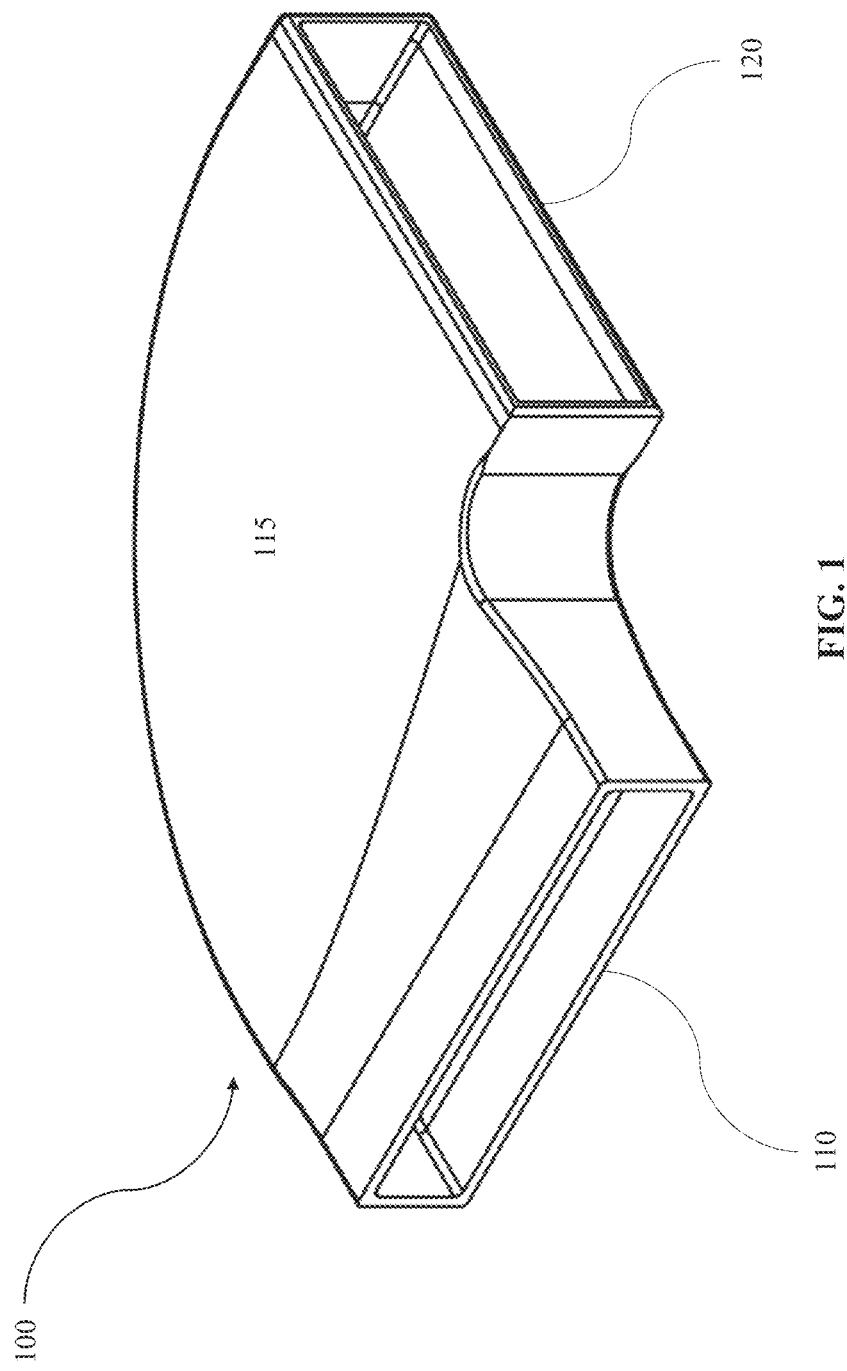
FIG. 1 illustrates a tapered duct connector in the form of an elbow connector according to one embodiment of the present disclosure.

FIG. 1 shows a tapered elbow connector 100 for connecting a supply duct of an RV supply duct assembly to a conditioned air receiving sleeve, hereinafter referred to as an "AC box sleeve," of the RV supply duct assembly. The tapered elbow connector 100 has a connector outlet 110 of cross-sectional area A, a connector inlet 120 of cross-sectional area B, and a curved connecting portion 115 that may be sloped on the upper and/or lower surfaces of the tapered elbow connector 100. As a result of this slope, the cross-sectional area B of the inlet 120 can be made to be greater than the cross-sectional area A of the outlet 110. As will be described in greater detail below with reference to FIGS. 6-8 and 10, this tapered duct design takes advantage of increased duct headspace in the vicinity of the AC unit where the roof cavity of the RV is typically at its maximum height, which maximizes duct volume at the inlet 120 and therefore optimizes the flow of cooled air from the AC unit to the interior of the RV. In addition, a conditioned air receiving sleeve, which is also described in detail below, may be provided in this area of increased headspace in fluid communication with the tapered elbow connector 100, and may have a sleeve height $h_S$ that is at least 1.5 times larger than the supply duct height $h_D$. The smooth curvature and taper of the curved connecting portion 115 also enables the air entering the inlet 120 to be redirected towards the outlet 110 with minimal flow rate loss, further enhancing airflow into the living space of the RV.

Figure 2:
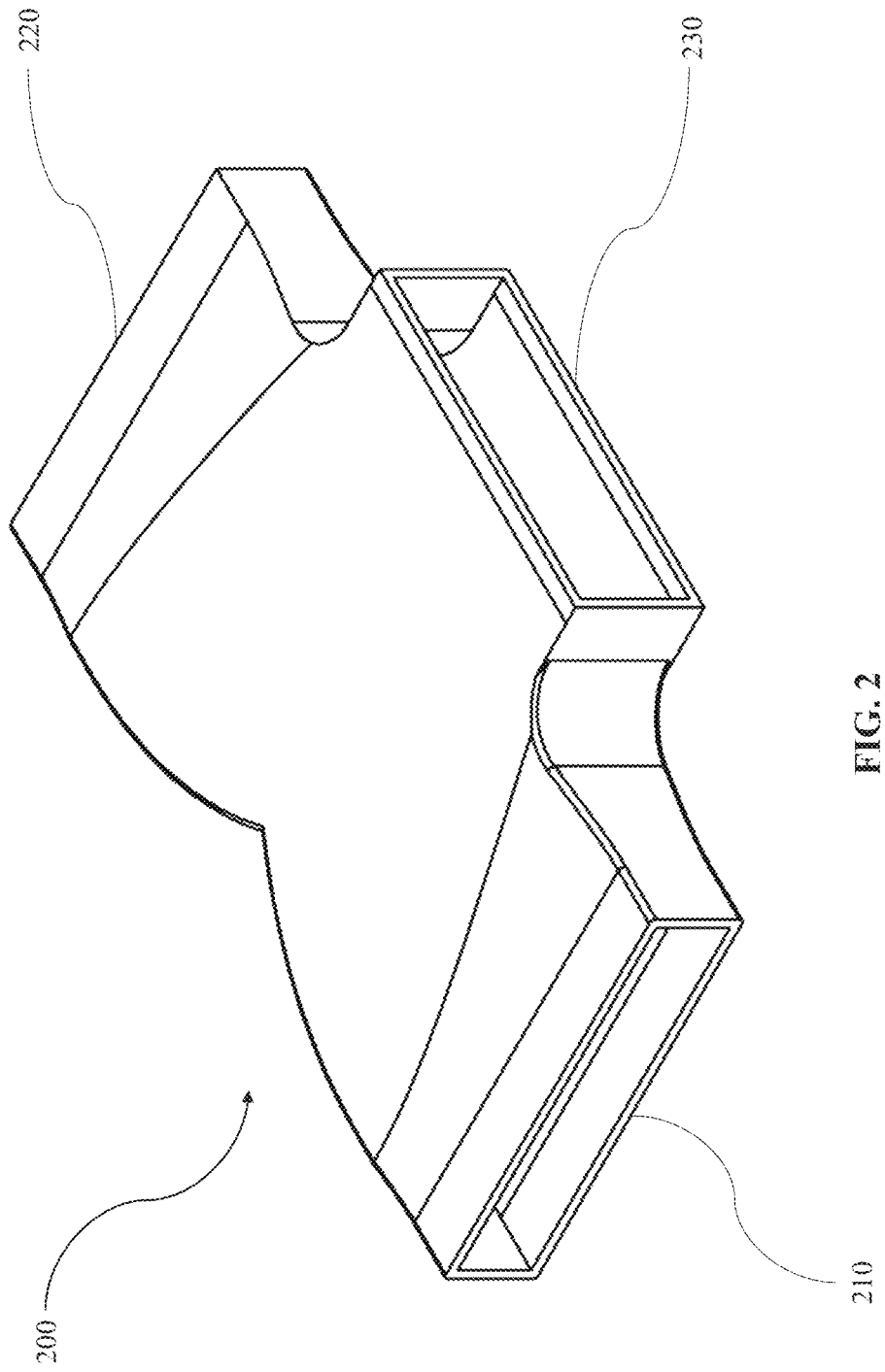
FIG. 2 illustrates a tapered duct connector in the form of a tapered Y-shaped connector according to one embodiment of the present disclosure.

FIG. 2 shows a tapered Y-shaped connector 200 connecting the supply duct assembly to the AC box sleeve. The Y-shaped connector 200 has two outlets 210 and 220 and an inlet 230. As is the case with the tapered elbow connector of FIG. 1, the inlet 230 is also designed to take advantage of increased duct headspace in the vicinity of the AC unit where the roof cavity of the RV is typically at it maximum height. The tapered elbow connector and the tapered Y-shaped connector can be manufactured using materials commonly used in making AC supply ducts such as, for example, foil backed foam board or other types of insulated duct foam.

In addition to the tapered elbow connector 100 and the Y-shaped connector 200, a duct joiner may be additionally incorporated in a supply duct assembly of an RV. Suitable duct joiners can be configured to connect two lengths of supply duct, end-to-end, to connect a tapered elbow connector to a length of supply duct, or to connect a tapered Y-shaped connector to a length of supply duct. The geometry of the duct joiner may be similar to that of the duct plug 50 illustrated below, with reference to FIGS. 9A and 9B, with the exception that the duct joiner will comprise two duct insert portions 52 on opposite sides of the flange 54, and that the flange of the duct joiner would be open to permit the passage of air from one duct component to the next.

Figure 3:
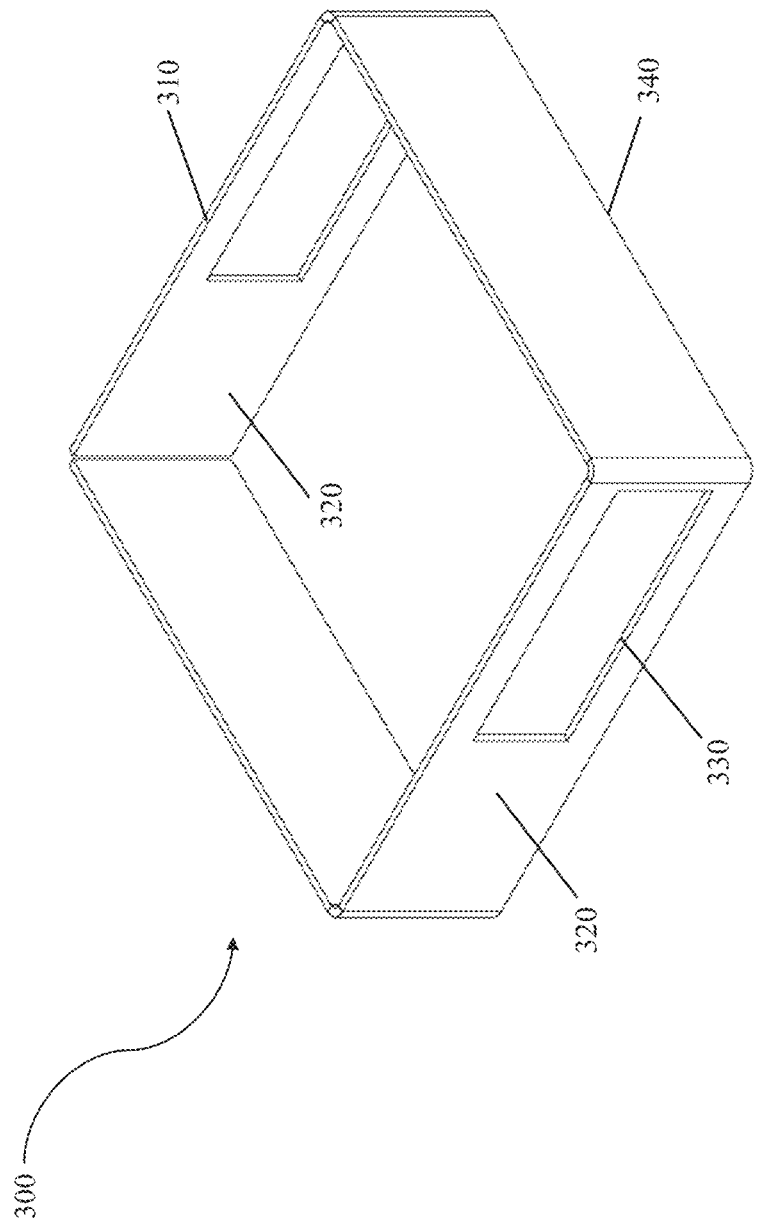
FIG. 3 illustrates an AC box sleeve according to one embodiment of the present disclosure.
Figure 12:
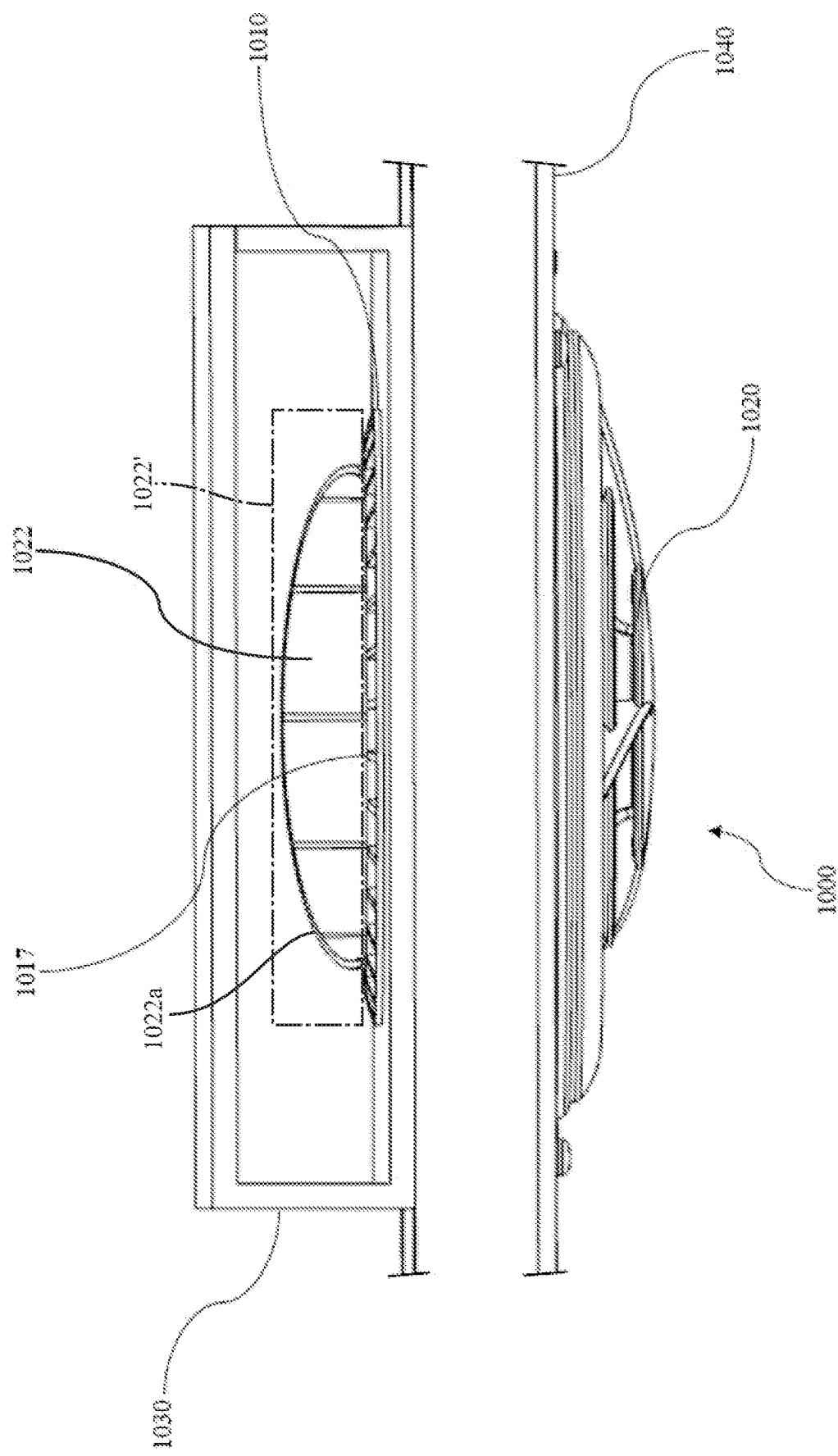
FIGS. 12-14 illustrate the diffusing vent assembly of FIG. 11, according to one embodiment of the present disclosure, in an installed state.

FIG. 3 illustrates a conditioned air receiving sleeve 300, or "AC box sleeve," that may be incorporated in RV supply duct assemblies according to the present disclosure. The conditioned air receiving sleeve 300 further comprises a conditioned air opening occupying at least a majority of a top side 310 of the conditioned air receiving sleeve 300, lateral sleeve walls 320 defining a sleeve height $h_S$ that is chosen to span an infra-ceiling space of a recreational vehicle, conditioned air passages 330 occupying the lateral sleeve walls 320, and a return air opening occupying at least a majority of a bottom side 340 of the lateral sleeve walls 320 of the conditioned air receiving sleeve 300. Referring to FIG. 12, infra-ceiling spaces of recreational vehicles may be formed between a ceiling board 1040 of the recreational vehicle and the supply ducts that are positioned above the ceiling board 1040 of the recreational vehicle. These spaces may typically range in height from about 2.0 cm to about 5.5 cm, such as from about 2.8 cm to about 3.2 cm. It should be noted that other infra-ceiling space heights are contemplated. In the illustrated embodiment, conditioned air passages 330 are provided on two of the lateral sleeve walls 320 but it is contemplated that the present disclosure also contemplates embodiments where only one conditioned air passage 330 is provided. The illustrated conditioned air receiving sleeve 300 comprises a six-sided rectangular cuboid where the conditioned air opening and the return air opening form opposite sides of the rectangular cuboid and two opposing conditioned air passages 330 occupy the opposing lateral sleeve walls 320.

Figure 6:
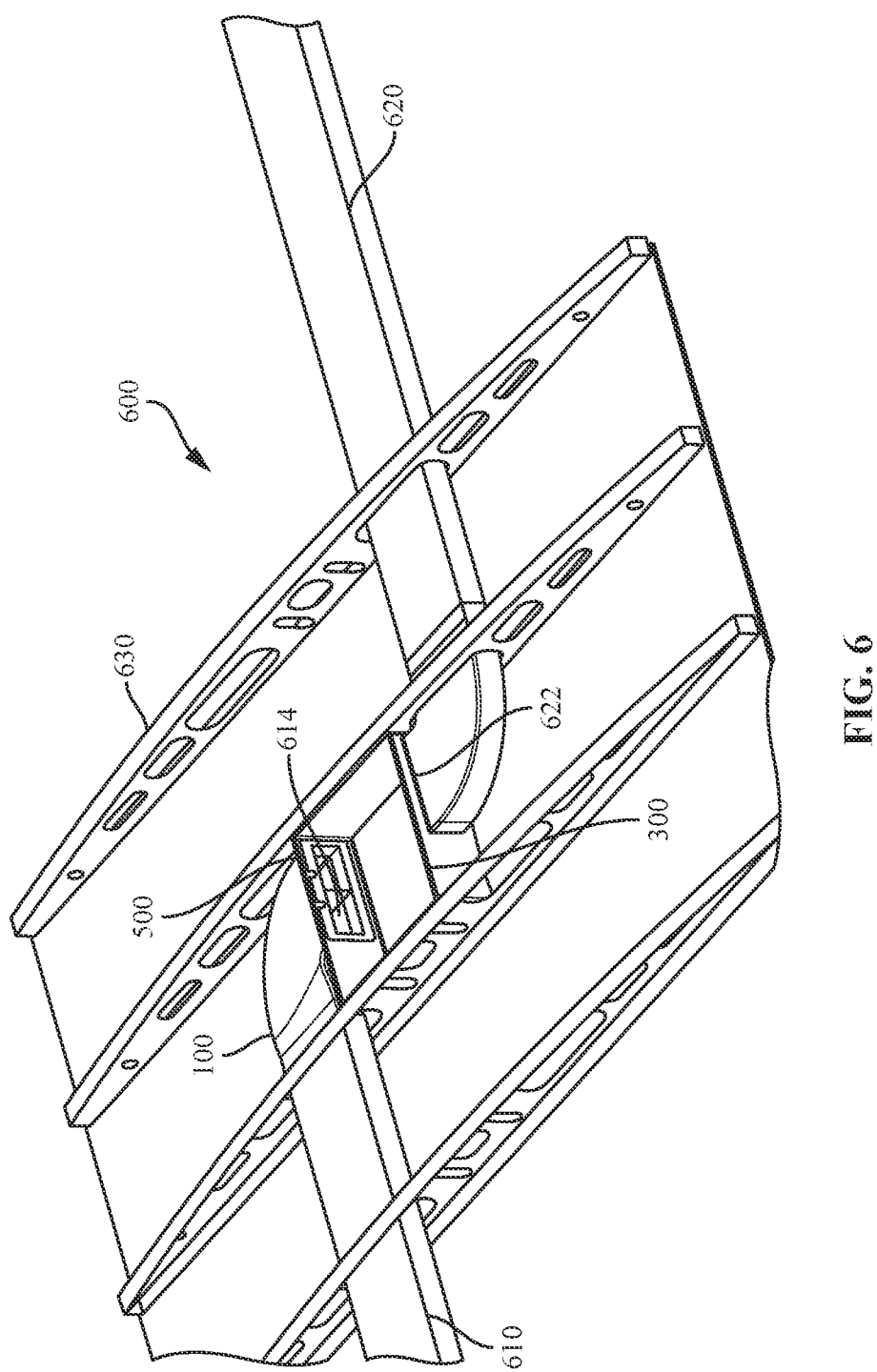
FIG. 6 illustrates a supply duct assembly according to one embodiment of the present disclosure.
Figure 7:
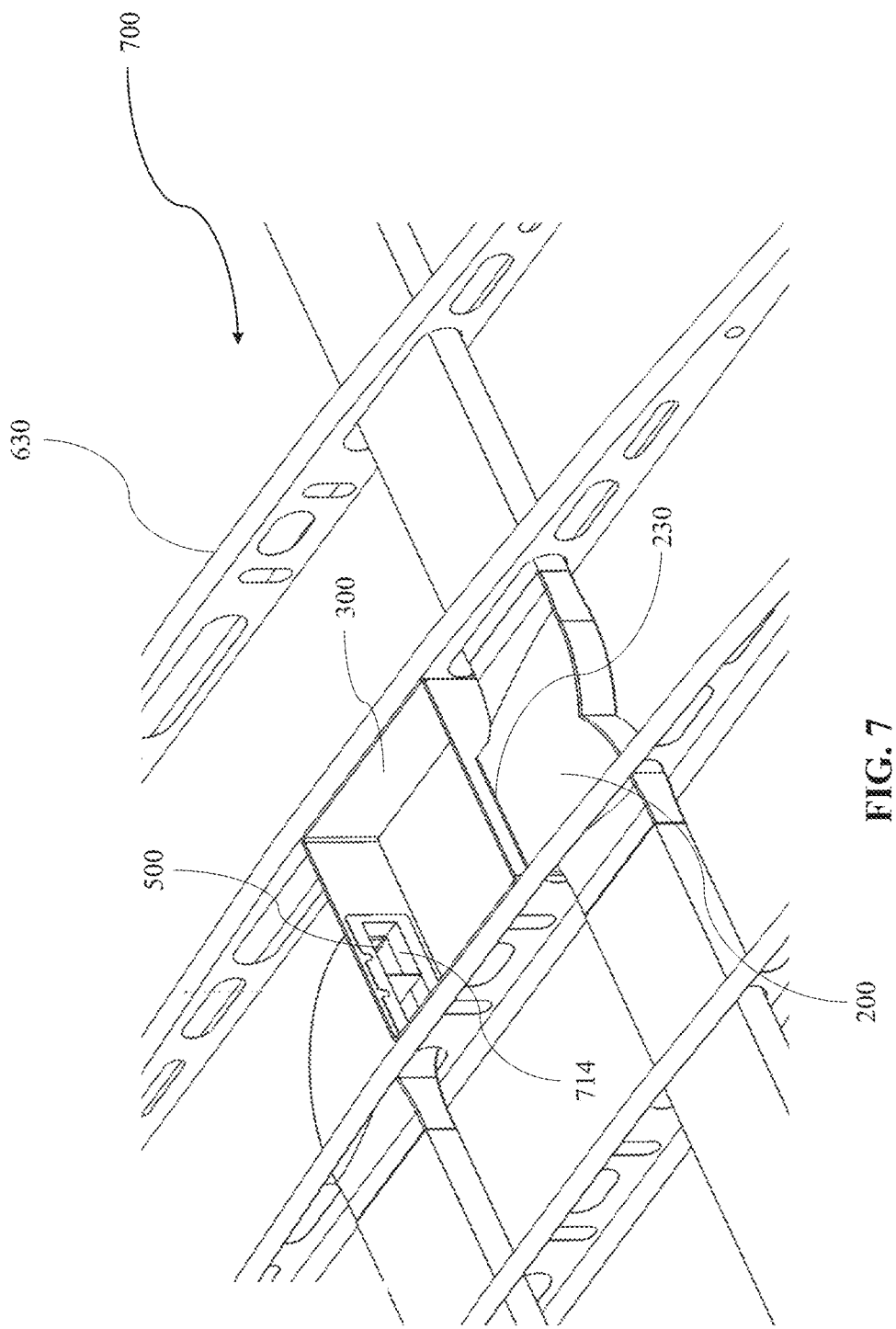
FIGS. 7 and 8 illustrate alternative supply duct assemblies according to the present disclosure.

Referring further to FIGS. 6 and 7, an AC box sleeve 300 may be used in a supply duct assembly in conjunction with a sleeve insert 500 and the tapered elbow connector 100 or the tapered Y-shaped connector 200 to optimize air flow from the conditioned air outlet of an AC unit of an RV, through the supply duct assembly 600, 700 of the RV, and into the interior of the RV. More specifically, referring to the supply duct assemblies 600, 700 illustrated in FIGS. 6 and 7, the present inventors have recognized that RV duct work installations often contain surface irregularities and structural features that might not be optimal for efficient air flow. The AC box sleeve 300 can be used to cover cracks, crevices, and other surface irregularities, and to keep conditioned air out of contact with structural features that might obstruct air flow or introduce heat into the cool air stream, thus providing thermally efficient, continuous, and relatively smooth surfaces for the transfer of conditioned air. Although a variety of materials will be suitable for constructing the AC box sleeve, it is contemplated that the AC box sleeve 300 may be made of insulated duct foam for optimal cooling efficiency and mass air flow transfer.

Figure 4A:
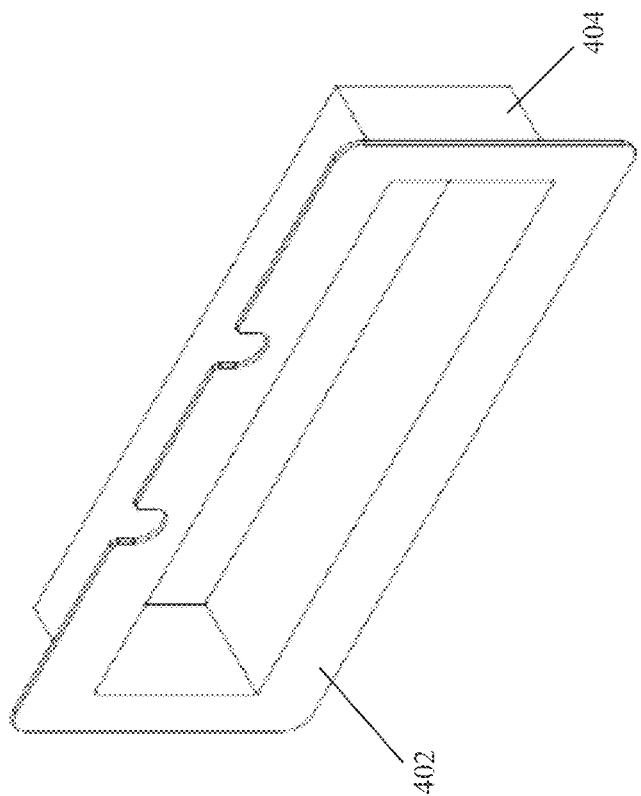
FIGS. 4A and 4B illustrate alternative sleeve inserts according to the present disclosure.
Figure 4B:
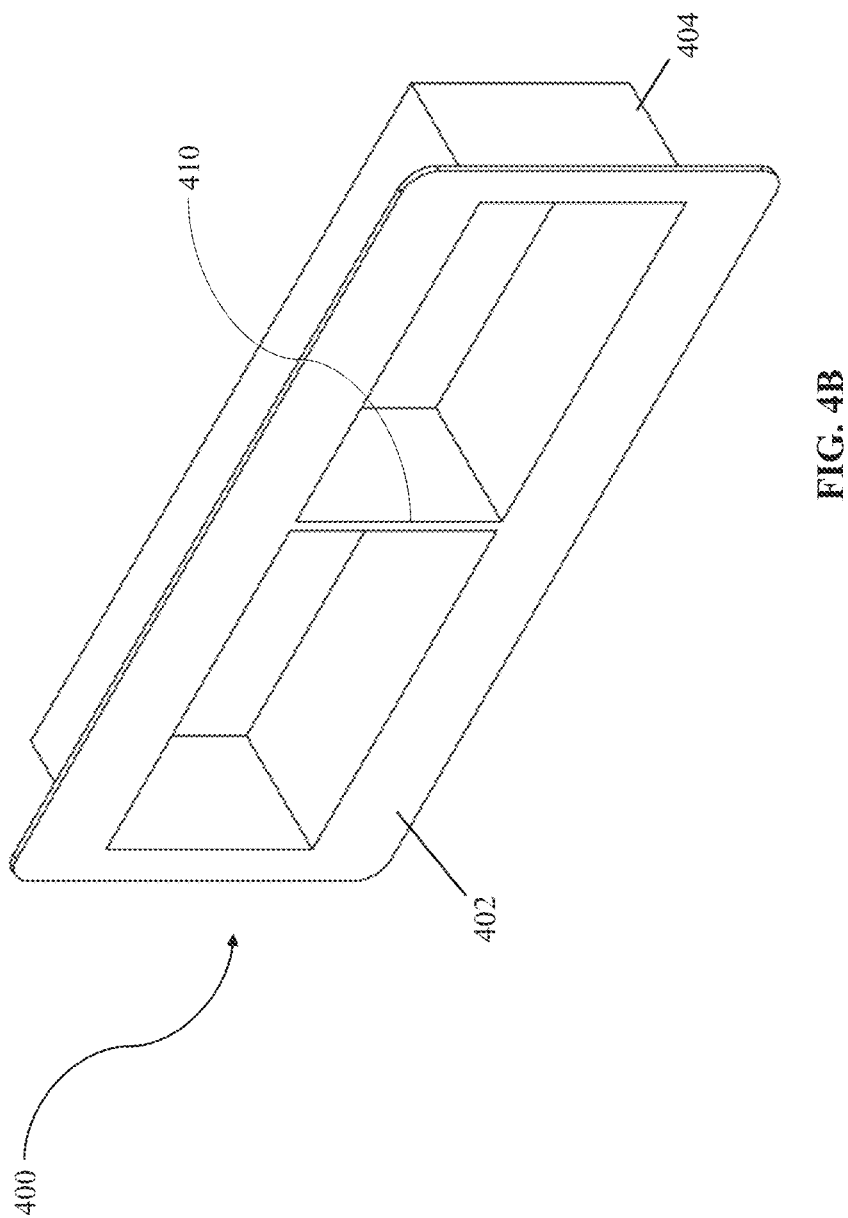

Although the supply duct assemblies of FIGS. 6 and 7 are illustrated with one particular type of sleeve insert 500, it is contemplated that the concepts of the present disclosure may be practiced using a variety of sleeve insert configurations to optimize the transfer of conditioned air from the AC box sleeve insert 500 into the remainder of the supply duct assembly of the RV. For example, FIGS. 4A, 4B, and 5 illustrate three different sleeve insert configurations. In each case, the illustrated sleeve insert 400, 500 comprises a rigid flange portion 402, 502 and a rigid insert portion 404, 504, and provides for consistent, structurally sound, and convenient securement of the tapered elbow connector 100 (see FIGS. 1 and 6) or the tapered Y-shaped connector 200 (See FIGS. 2 and 7) to the AC box sleeve 300. The sleeve insert 400, 500 further prevents collapse of the opening of the elbow connector 100 and the tapered Y-shaped connector 200 within the AC box sleeve 300.

More specifically, rigid flange portion 402, 502 of the sleeve insert 400, 500 can be mounted to the interior of the AC box sleeve 300 while the rigid insert portion 404, 504 extends through the thickness of the AC box sleeve 300 into the interior of the tapered elbow connector 100 or the tapered Y-shaped connector 200, as is illustrated in FIGS. 6 and 7. The insert portion 404, 504 of the sleeve insert 400, 500 can be sized to fit snugly within and frictionally engage the interior surfaces, that is the inside periphery, of the ductwork into which it is inserted. Duct tape may be used to secure the insert portion 404, 504 of the sleeve insert 400 within the interior surfaces of the ductwork into which it is inserted.

In the embodiments illustrated in FIGS. 6 and 7, the two opposing conditioned air passages with which the sleeve inserts 400, 500 are engaged will occupy opposing lateral sleeve walls of the conditioned air receiving sleeve 300. Typically, the recreational vehicle comprising the supply duct assembly 600, 700 will comprise a longitudinal dimension extending parallel to the sides of the recreational vehicle, and the two opposing conditioned air passages of the conditioned air receiving sleeve will face opposite sides of the recreational vehicle.

Referring collectively to FIGS. 3-8, the flange portion 402, 502 of the sleeve insert 400, 500 is sized to about a framed portion of the conditioned air passage 330 on the lateral sleeve wall 320 of the conditioned air receiving sleeve 300 to provide for securement of the sleeve insert 400, 500 to the conditioned air receiving sleeve 300 along the framed portion of the conditioned air passage 330 with the insert portion 404, 504 extending through the connector inlet 120, 230 of the tapered duct connector. Tape or fasteners may be used to secure the rigid flange portion 402, 502 to the interior side of the AC box sleeve 300. It is contemplated that sleeve inserts 400, 500 according to the present disclosure may be conveniently fabricated from polypropylene or similar materials, although a variety of alternative materials will also fall within the scope of the present disclosure.

The sleeve insert 400 illustrated in FIG. 4B differs from the sleeve insert 400 illustrated in FIG. 4A in that it comprises an internal flow directing vane 410. The sleeve insert 500 of FIG. 5, includes an extended turning vane 550, which can be used to promote uniform airflow and reduce pressure drop in tapered elbow connectors, such as those illustrated in FIGS. 1 and 6.

FIG. 6 shows a supply duct assembly 600 having the tapered elbow connector 100 with supply ducts 610 and 620 for supplying conditioned air. The supply duct assembly 600 is accommodated around the rafters 630 in the ceiling space of the RV. Both of the inlets 614 and 622 of the supply duct 610 are fluidly connected to an AC unit via the AC box sleeve 300.

Figure 8:
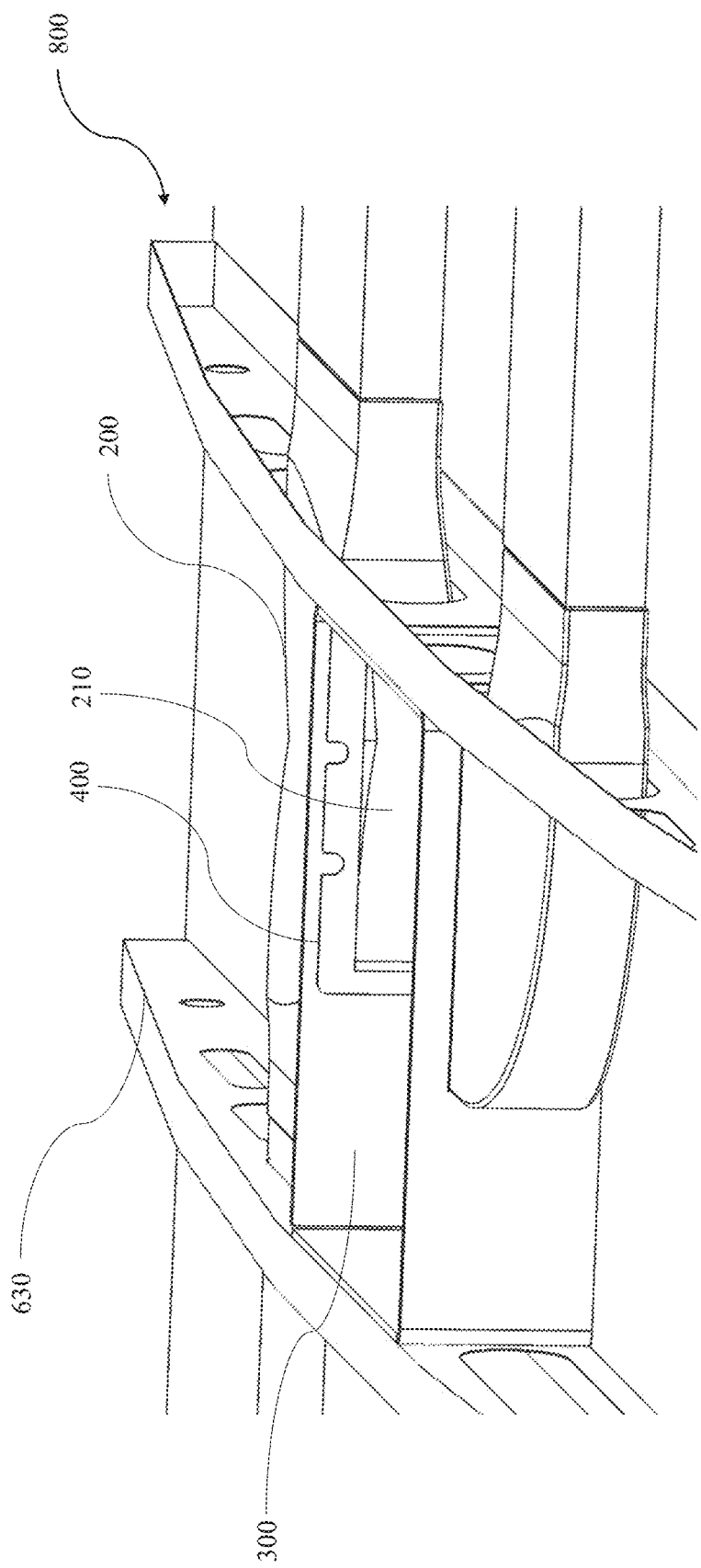

FIG. 7 depicts a supply duct assembly 700 having a tapered Y-shaped connector 200 in place of one of the tapered elbow connectors 100 illustrated in the embodiment of FIG. 6. FIG. 8 depicts a close-up view of the connection between AC box sleeve 300 and the tapered Y-shaped connector 200, as described in FIG. 7.

FIG. 8 illustrates a supply duct assembly 800 fit within the rafters 630 of an RV. In this embodiment, the sleeve insert 400 of FIG. 4A is fit with the AC box sleeve 300 and the tapered Y-shaped connector 200.

FIGS. 9A and 9B are respective isometric views of a duct plug 50 that may be used to terminate otherwise open ends of supply duct runs such as, for example, the ends of supply ducts 610 and 620 of FIG. 6. The duct plug 50 comprises an insert portion 52 that is designed to fit snugly within the open end of the supply duct run, and a closed flange 54 that provides a sealed hard stop at the end of the supply duct run. The present inventors have found that duct plugs used in this manner can improve overall airflow from the AC unit into the interior of the RV and are more reliable than systems where the ends of the supply duct runs are pinched closed and terminated with sealing tape. The duct plug 50 may, for example, be fabricated from polypropylene.

The AC box sleeve, tapered elbow connectors, tapered Y-shaped ducts, sleeve inserts, alternative sleeve inserts, and duct plugs contemplated herein can be advantageously adapted to accommodate a variety of different rafter configurations having varying bottom plate dimensions, clearance heights, and clearance widths for use in different RVs having different rafter configurations, and a variety of different air conditioning units.

For example, and not by way of limitation, it is contemplated that an AC box sleeve may have a height of about 4-5 inches and side lengths of about 14-15 inches. The openings for receiving the sleeve inserts may have a length of about 8 inches and a height of about 2-3 inches.

Similarly, and not by way of limitation, in one embodiment, the tapered elbow connector is constructed to have a connector inlet dimension of about 8.0 inches by 2.63 inches, a connector outlet dimension of about 8.5 inches by 1.9 inches, an inner radius of curvature of about 1.25 inches, and an outer radius of curvature of about 1.38 inches. In this embodiment, the inlet has a total area of about 21.04 square inches and the outlet has a total area of about 16.15 square inches. The average slope, representing a net increase in a transitional duct height of the connector along a linear projection from the middle of the top edge the connector outlet to the middle of the top edge the connector inlet is between about 0.05 and about 0.10, to prevent undue turbulence in the connector but also permit a sufficient change in cross sectional flow area between the inlet and the outlet. In this embodiment, the inlet is about 30% larger in cross section than the outlet. More broadly, it is contemplated that other embodiments of the tapered elbow connector will most advantageously have an inlet that is at least about 20% larger in cross section than the outlet or, more specifically, between about 20% and about 40% larger than the outlet.

The tapered Y-shaped connectors of the present disclosure may be constructed to have dimensions similar to the tapered elbow connector. Regardless of the type of tapered duct connector employed in accordance with the teachings of the present disclosure, it is contemplated that the tapered duct connector may comprise a transitional duct width that decreases from the connector outlet to the connector inlet as the transitional duct height increases from the connector outlet to the connector inlet. In addition, the respective magnitudes of decreasing transitional duct width and increasing transitional duct height may be such that the cross-sectional flow area of the connector inlet will be at least approximately 20% larger than a cross-sectional flow area of the connector outlet. In some embodiments, the connector inlet may comprise a cross-sectional flow area that is between approximately 20% and approximately 40% larger than a cross-sectional flow area of the connector outlet.

To further optimize mass flow transfer from the conditioned air receiving sleeve to the supply duct without undue turbulence, although the transitional duct height of the tapered duct connector increases by a factor of at least about 1.25, it may be preferable to ensure that the average slope in the transitional duct height of the connector from the connector outlet to the connector inlet is not too large. Even with a slope of between about 0.05 and about 0.10, it will be possible to ensure that the cross-sectional flow area at the connector inlet is at least approximately 20% larger than a cross-sectional flow area of the connector outlet. In many instances it may be optimal to ensure that the connector inlet comprises a cross-sectional flow area that is between approximately 20% and approximately 40% larger than a cross-sectional flow area of the connector outlet.

The sleeve inserts, duct joiners and duct plugs of the present disclosure should be constructed to close-fit engagement with complementary components of the supply duct assembly.

Figure 10:
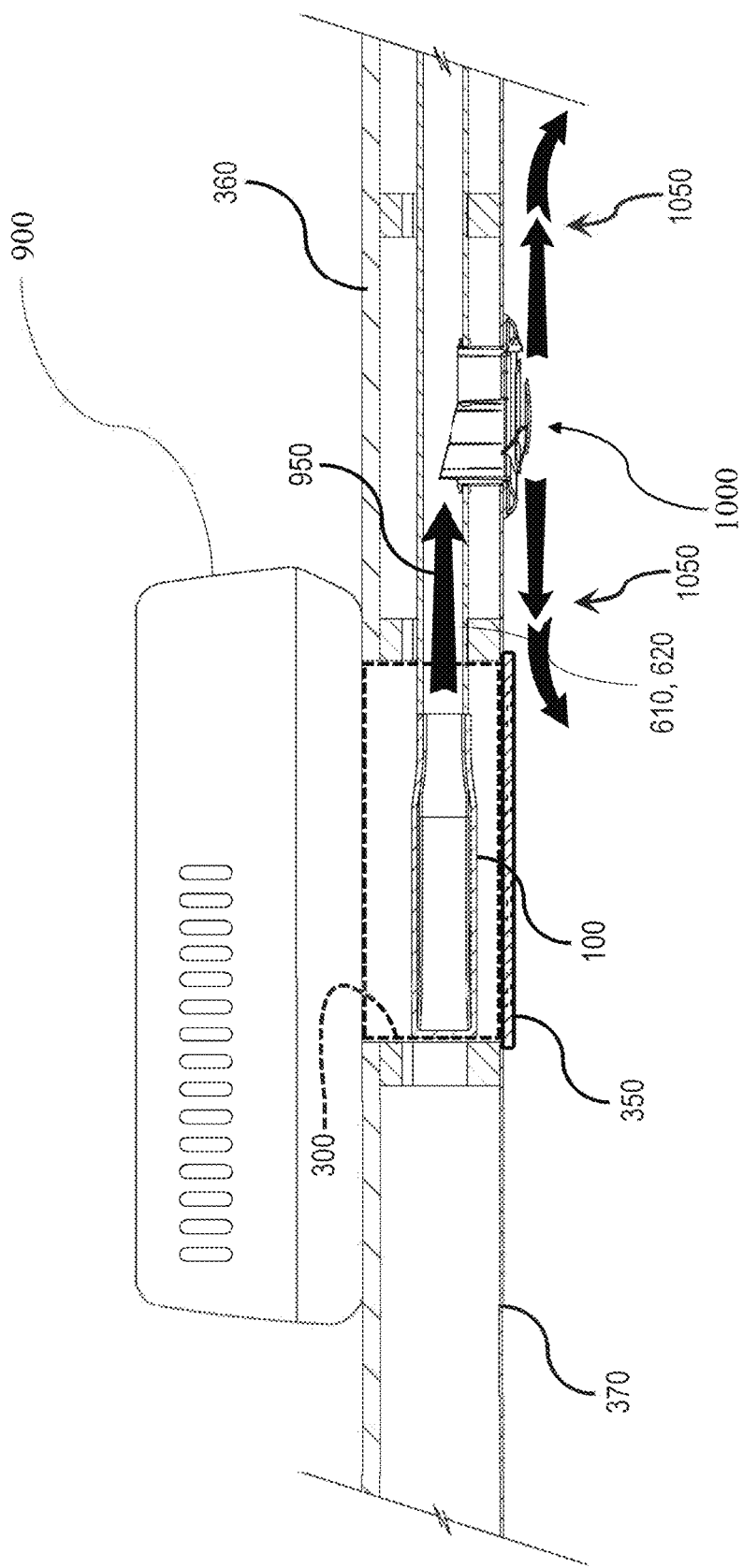
FIG. 10 illustrates a roof-mounted AC unit, in-duct air flow within a portion of a supply duct assembly of an RV and, a diffusing vent assembly according to one embodiment of the present disclosure.

Referring to FIGS. 10-18, embodiments of the present disclosure further relate to the provision of a diffusing vent assembly 1000 in cooperation with an AC unit 900, return air assembly 350, and the aforementioned supply duct assemblies 600, 700 of a recreational vehicle which, in the illustrated embodiment, include an AC box sleeve 300, a tapered elbow connector 100, and supply ducts 610, 620. The AC box sleeve 300 is shown with dashed lines in FIG. 10 to help illustrate its relative positioning in the infra-ceiling space of the RV, but it would not actually be visible in the particular cross-section chosen for FIG. 10. Although FIG. 10 depicts the AC unit 900 installed on the roof of the RV in one particular configuration, this example is merely presented for illustrative purposes and it is noted that the concepts of the present disclosure are not limited to the specific system configuration illustrated in FIG. 10. The particular configuration specifics of the AC unit 900 and the return air assembly 350 are beyond the scope of the present disclosure and may be gleaned from conventional or yet-to-be developed teachings on the subjects.

In the configuration illustrated in FIG. 10, in-duct conditioned air 950 flows from an AC unit 900, into the AC box sleeve 300, through a tapered elbow connector 100, to the supply ducts 610, 620 of the system. The conditioned air then passes to the interior of the RV via the diffusing vent assembly 1000, which improves the airflow from the supply ducts into the interior of the RV and increases the efficiency of the AC unit 900. Return air passes through a return air grille of the return air assembly 350, back to the AC unit 900 for recirculation or exhaust. Notably, the AC box sleeve 300 spans the height of the infra-ceiling space between the AC unit 900 and the return air assembly 350. More specifically, the infra-ceiling space is the space between the exterior RV roofing layer 360 and the interior ceiling board 370 of the RV. An AC box sleeve "spans" this infra-ceiling space by extending the entirety of the distance between the RV roofing layer 360 and the interior ceiling board 370, with the understanding that the sleeve may extend beyond the roofing layer 360, the ceiling board 370, or both, or that supplemental sealing elements, such as gaskets, seals, etc., may be provided to contribute to this span.

Where a recreational vehicle according to the present disclosure comprises a roof-mounted AC unit 900 and a ceiling-mounted return air assembly 350, it is contemplated that the roof-mounted AC unit 900 and the ceiling-mounted return air assembly 350 may enclose opposite sides of the conditioned air receiving sleeve 300, with the roof-mounted AC unit 900 over the conditioned air opening of the conditioned air receiving sleeve 300 and the return air assembly 350 over the return air opening of the conditioned air receiving sleeve.

Figure 11:
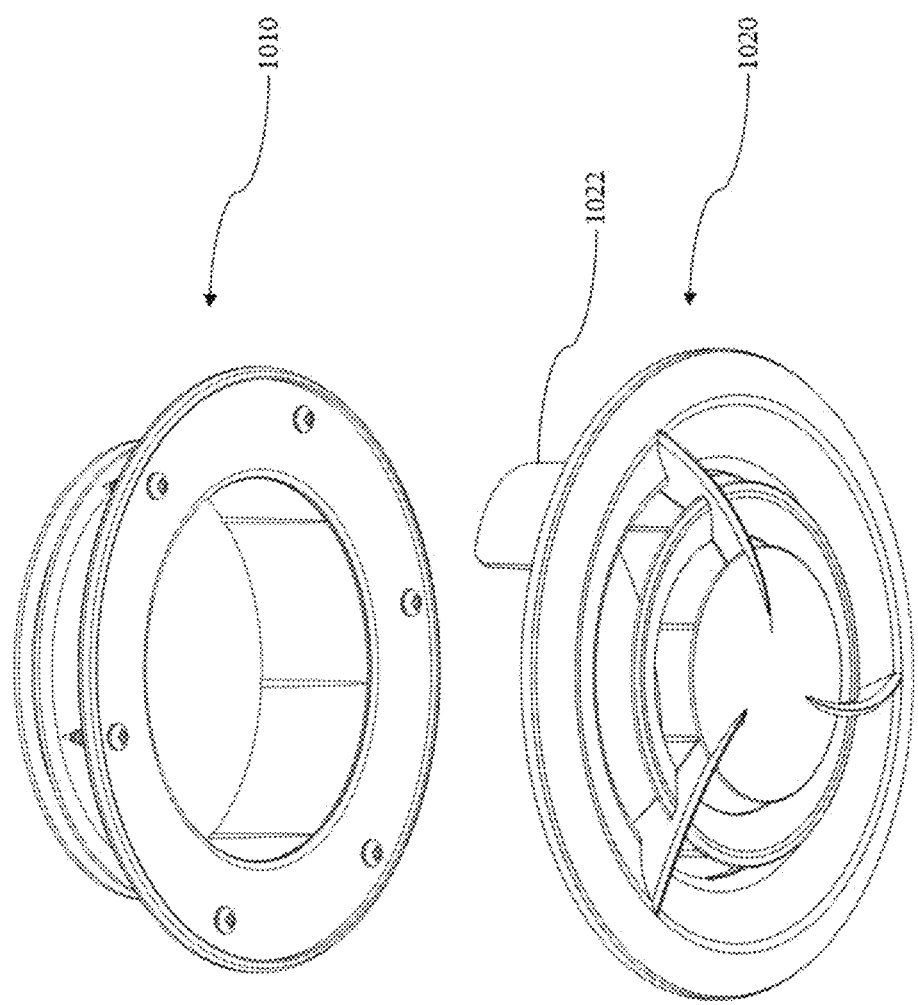
FIG. 11 illustrates components of a diffusing vent assembly according to one embodiment of the present disclosure.

Referring specifically to FIG. 11, the diffusing vent assembly 1000 comprises a diffuser base 1010 and a diffusing head 1020. The diffusing head 1020 may comprise an air blade 1022. The air blade 1022 of the diffusing head 1020 may extend into the path of the in-duct conditioned air 950 illustrated in FIG. 10.

Figure 13:
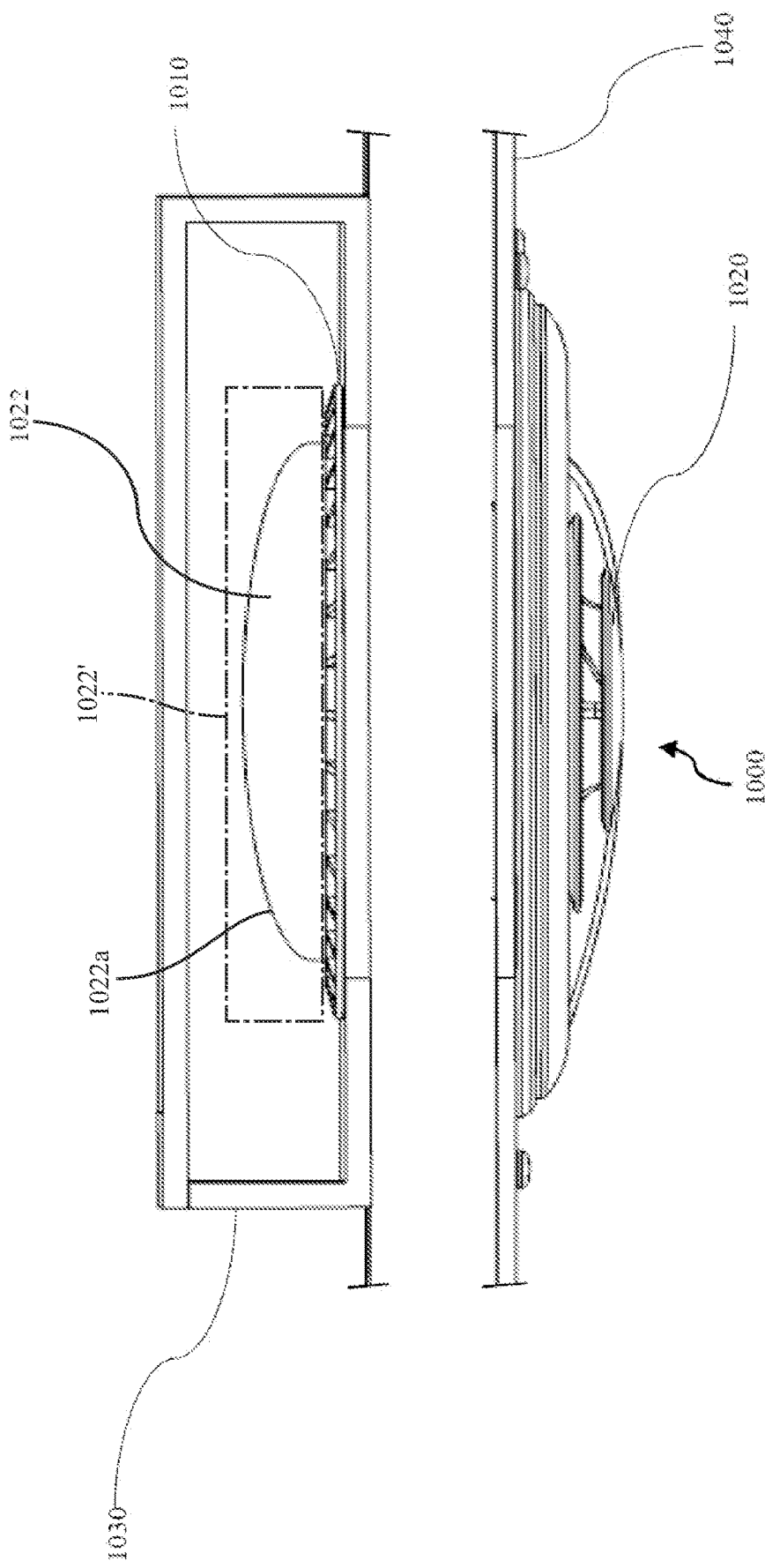
Figure 14:
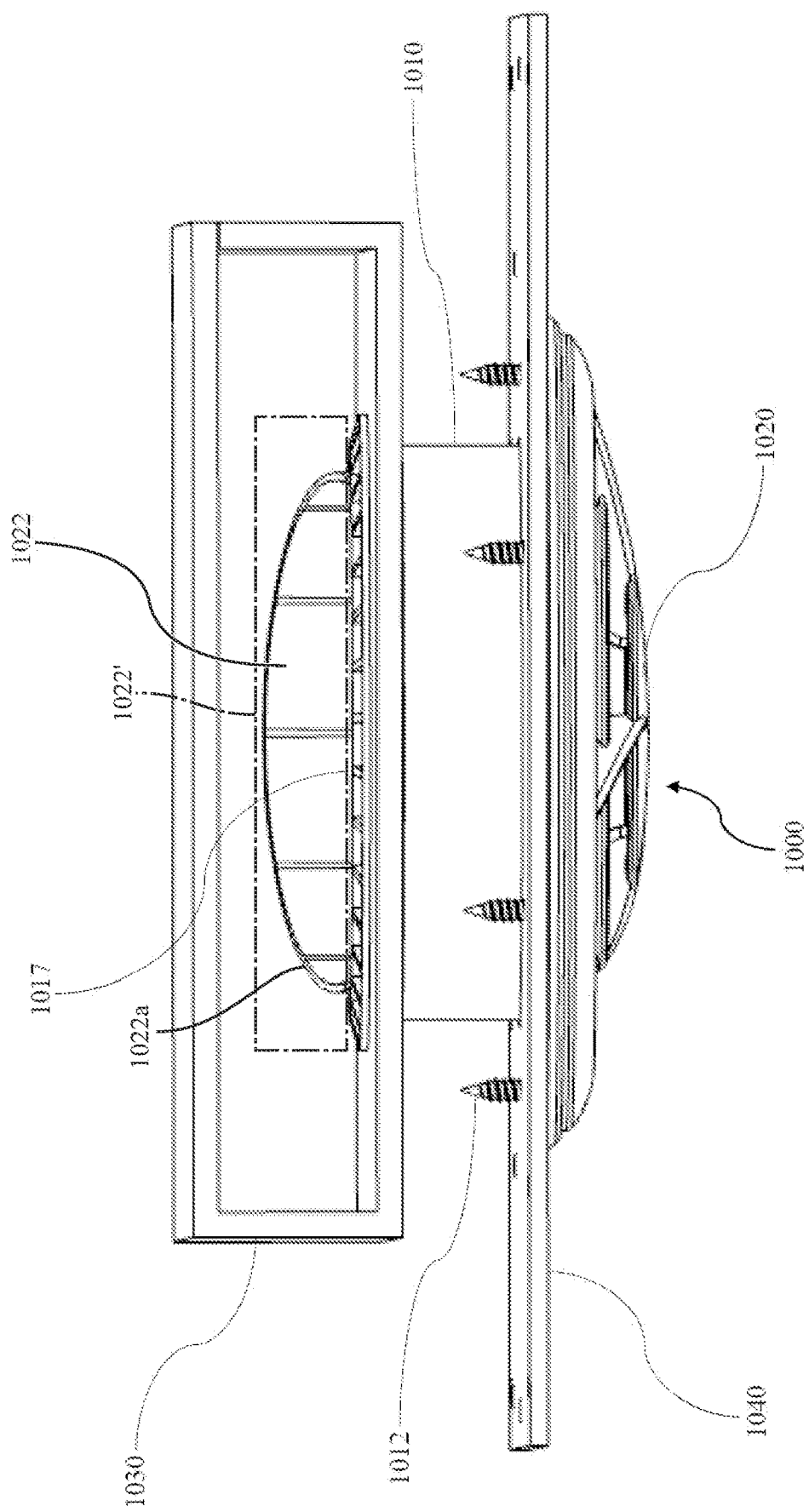

Referring to FIGS. 12-14, the diffusing vent assembly 1000 may be installed in an RV ceiling. FIGS. 12 and 13 show opposing cross-sectional views of a portion of an RV ceiling including a supply duct 1030 and the ceiling board 1040. FIG. 14 also shows the diffusing vent assembly 1000 in the installed state. Here, the body of the diffuser base 1010 is shown in relation to both the supply duct 1030 and the ceiling board 1040 of the RV. The diffusing vent assembly 1000 may be installed in the RV ceiling, with the air blade 1022 extending into the supply duct 1030. The ceiling board 1040 may be spaced from the supply duct 1030. This spacing may form a gap in the ceiling which is spanned by a portion of the diffusing vent assembly 1000.

Figure 15:
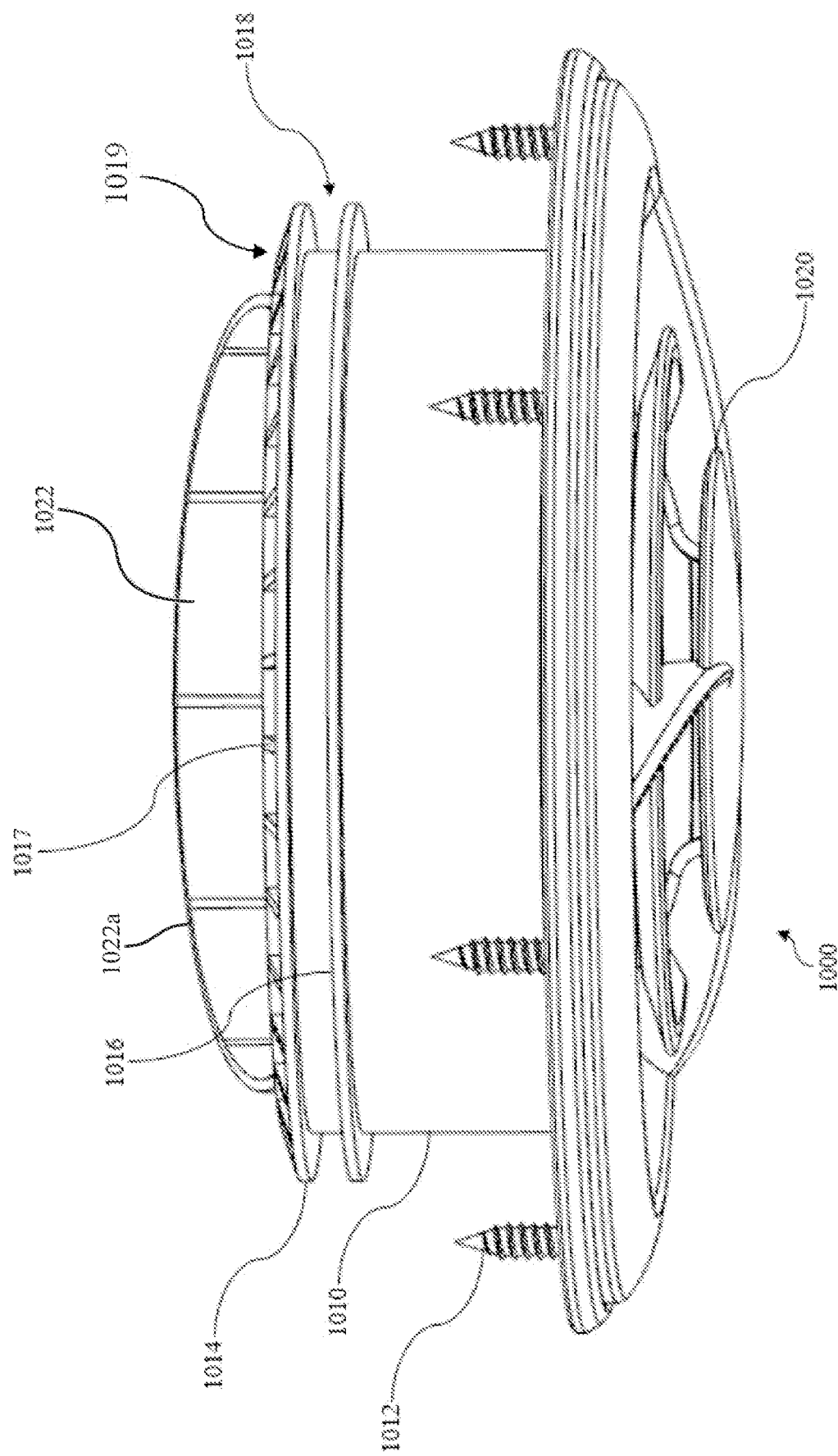
FIG. 15 illustrates the diffusing vent assembly of FIG. 11, according to one embodiment of the present disclosure, in an assembled but uninstalled state.

FIG. 15 shows the diffusing vent assembly 1000 without the supply duct 1030 or ceiling board 1040 of the RV. FIGS. 16A-C and FIGS. 17A-C further show various views of the diffuser base 1010 and diffusing head 1020 of the diffusing vent assembly 1000. The diffuser base 1010 and diffusing head 1020 will now be described in greater detail.

Figure 16A:
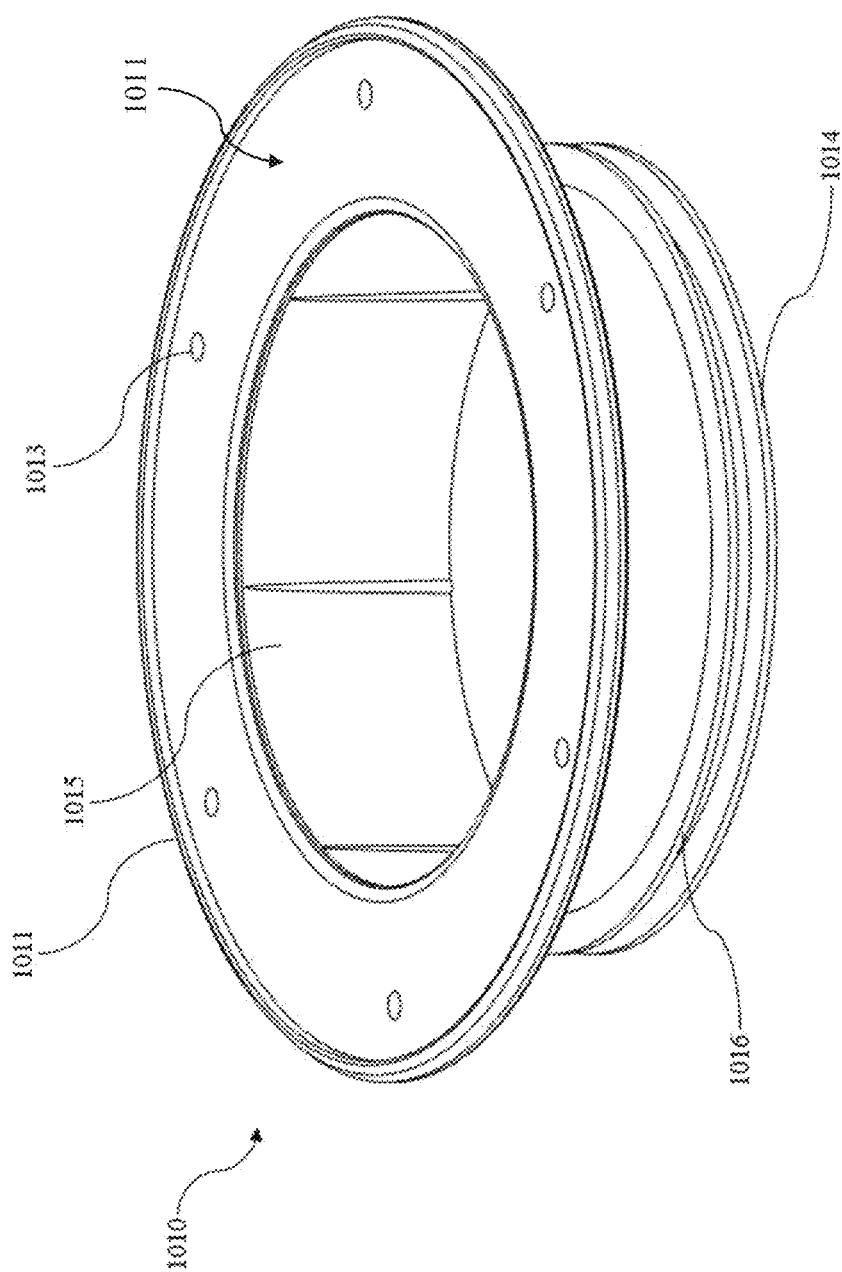
FIGS. 16A-16C illustrate a diffuser base of a diffusing vent assembly, according to one embodiment of the present disclosure, from a variety of perspectives.
Figure 16B:
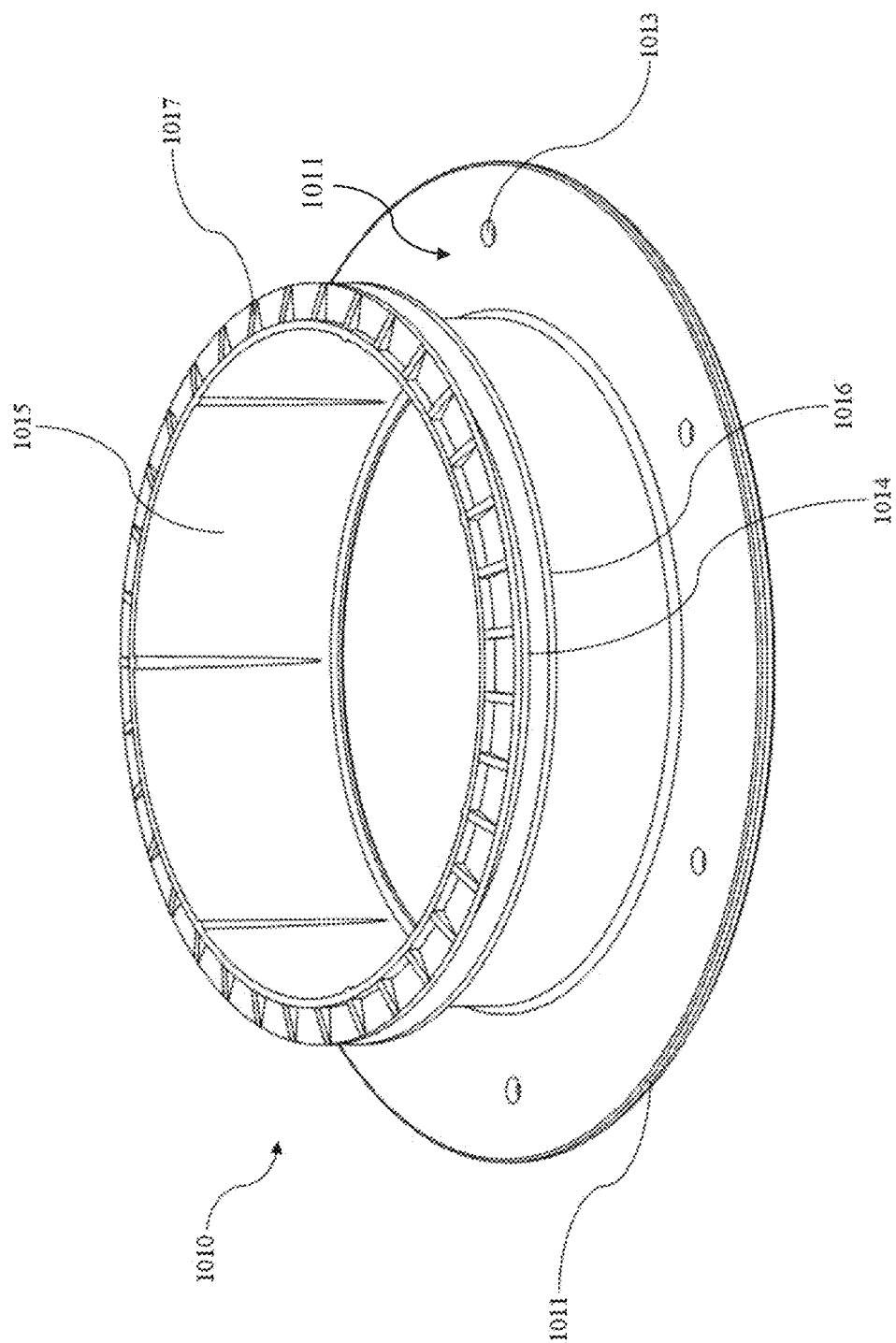
Figure 16C:
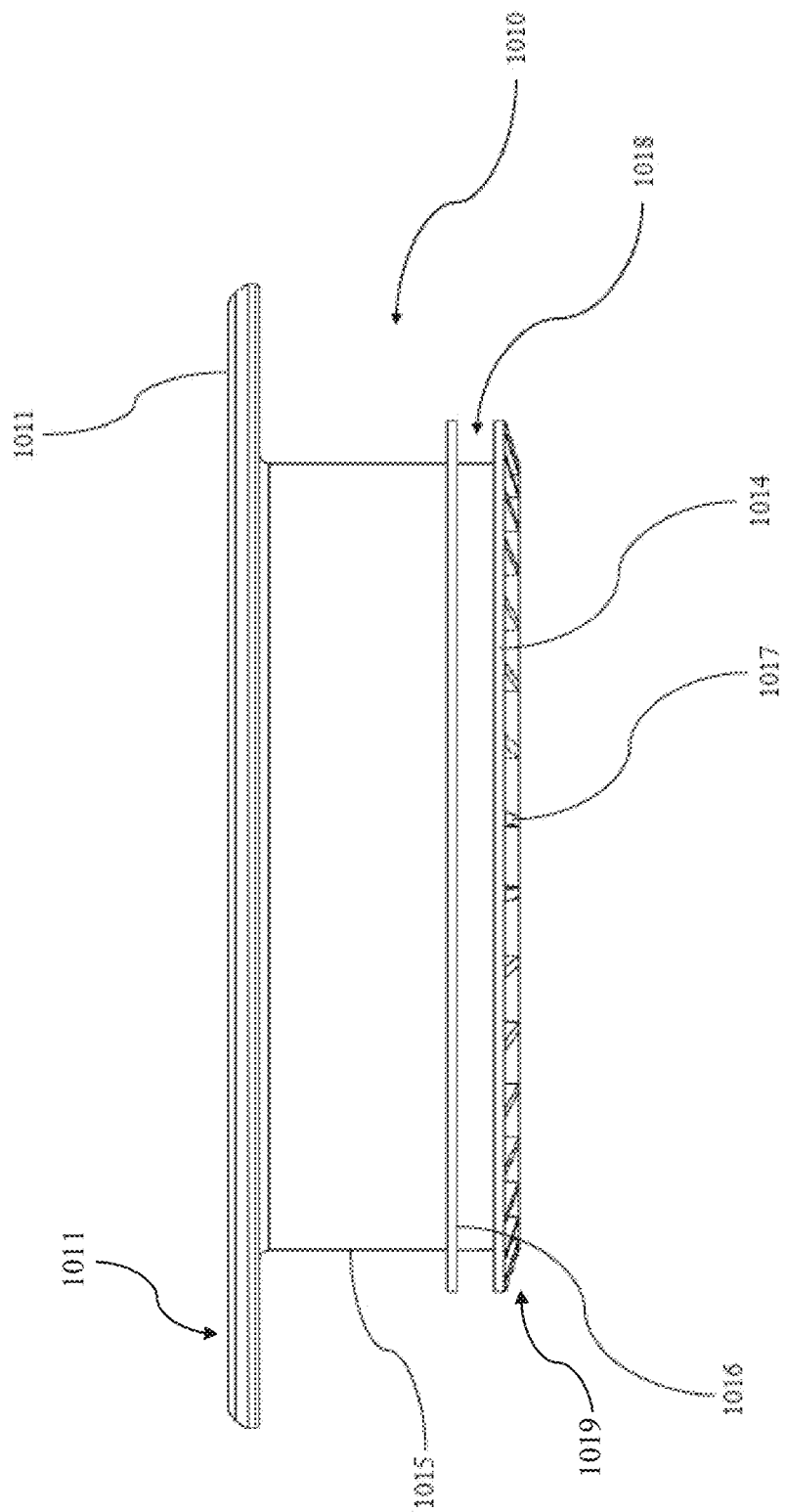

As shown in FIGS. 16A-C, the diffuser base 1010 may comprise a mounting flange 1011, a collar 1015, and a ductwork fixation channel 1018. The collar 1015 may extend from the mounting flange 1011. The ductwork fixation channel 1018 may be formed about an outside periphery of the collar 1015. The collar 1015 of the diffuser base 1010 may define a collar 1015 extension length c between the mounting flange 1011 and the ductwork fixation channel 1018 of the diffuser base 1010. The collar 1015 extension length may be large enough to span the infra-ceiling space of the recreational vehicle. The collar 1015 may receive and conduct air from the supply duct 1030. The mounting flange 1011 of the diffuser base 1010 may extend radially from the collar 1015 of the diffuser base 1010. The mounting flange 1011 may comprise a fastener opening 1013 positioned on and extending through the mounting flange 1011. A fastener 1012 may extend through the fastener opening 1013 and engage the ceiling board 1040 to fix a position of the diffuser base 1010. The mounting flange 1011 may be substantially circular or any other suitable shape. Similarly, the collar 1015, which may be substantially perpendicular to the mounting flange 1011, may also be substantially circular or any other suitable shape.

Figure 17A:
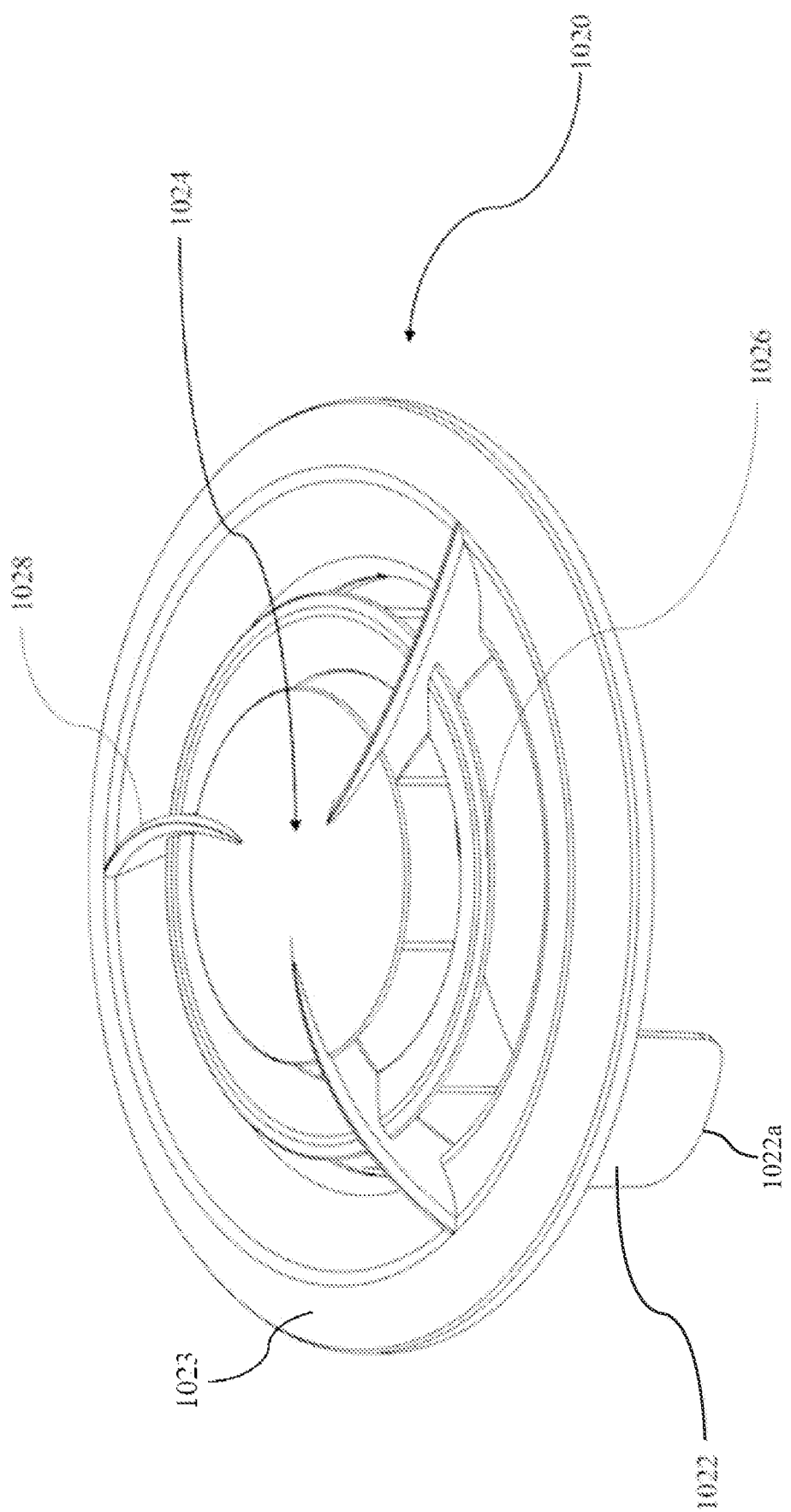
Figure 17B:
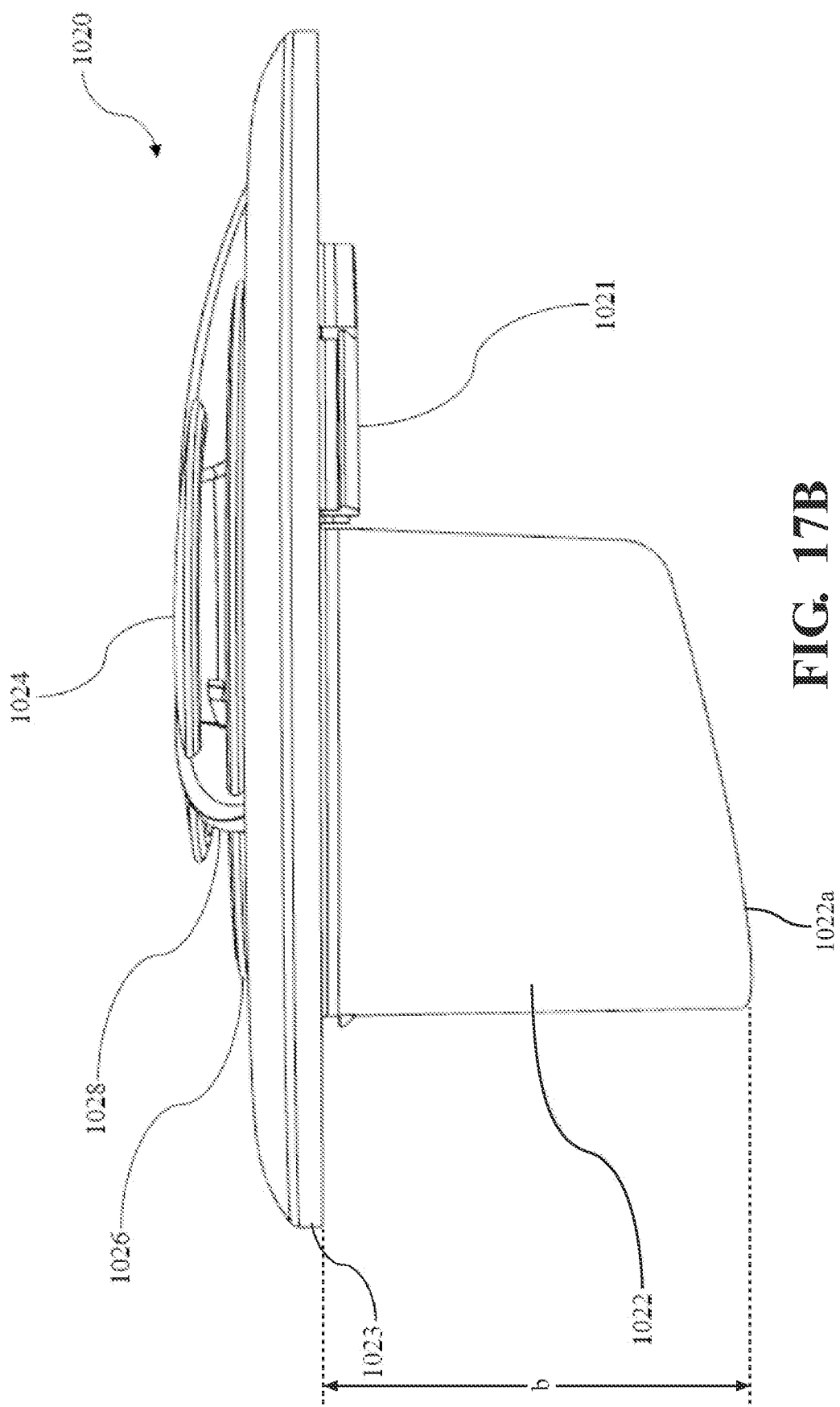

Now referring to FIGS. 17A-C, the diffusing head 1020 may comprise a diffuser vane configuration, a rotational flange 1023, and an air blade 1022. The rotational flange 1023 may surround the diffuser vane configuration. The air blade 1022 may extend from the rotational flange 1023. The air blade 1022 may comprise a terminal edge 1022a and may define an air blade 1022 extension length b between the rotational flange 1023 of the diffusing head 1020 and the terminal edge 1022a of the air blade 1022. The air blade 1022 extension length b may be greater than the collar 1015 extension length c. Further, as is clearly illustrated in FIGS. 12-15, 17A, 17B, 17C, 18A, and 18B, the terminal edge 1022a slopes bi-directionally away from a maximum point of extension along a circumferential path about a rotational axis A of the diffusing head 1020. The air blade 1022 may either be an integral part of the diffusing head 1020 or a separate detachable part of the diffusing head 1020. Similar to the diffuser base 1010, the diffusing head 1020 may be substantially circular or any other suitable shape.

Figure 18A:
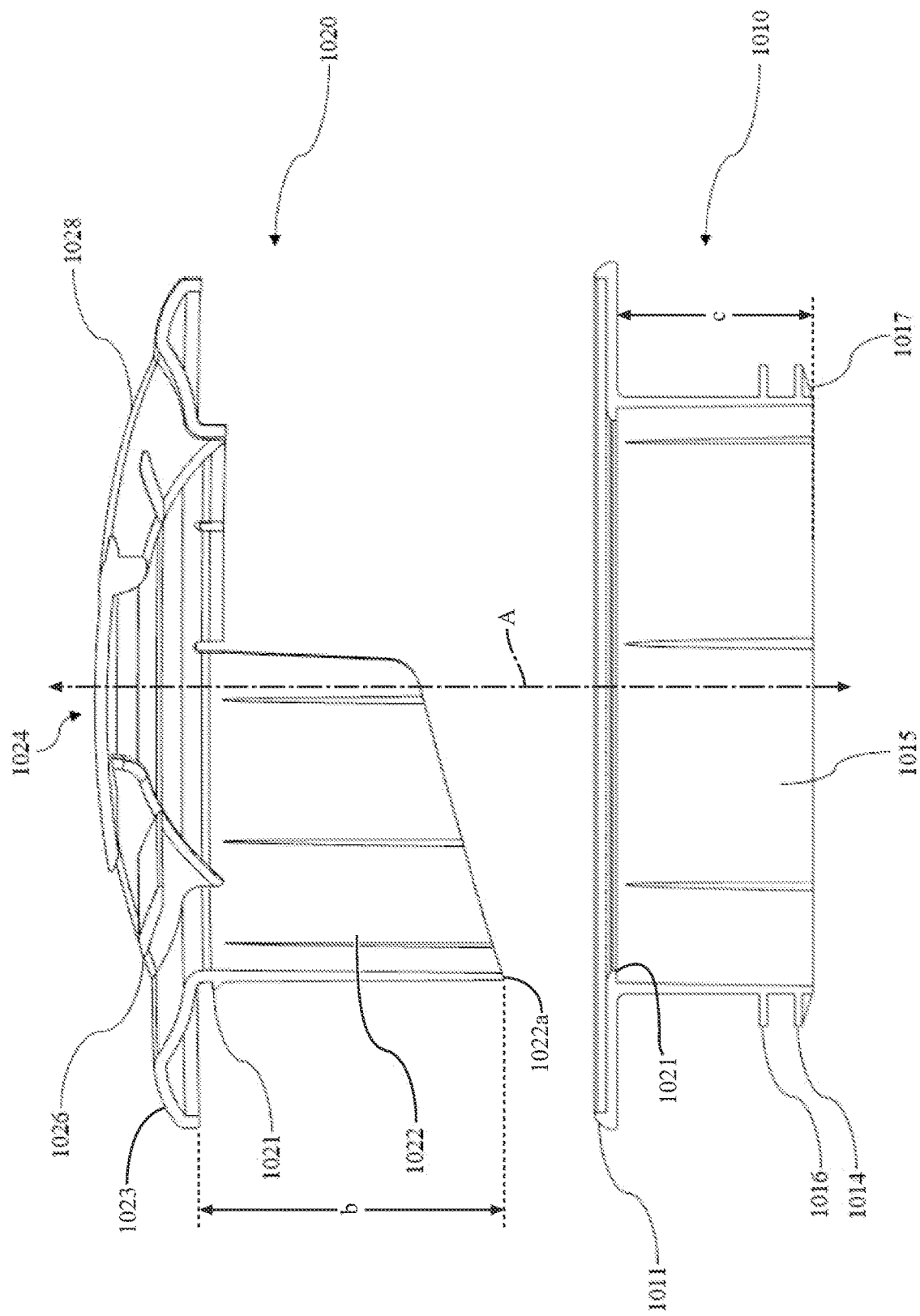
Figure 19A:
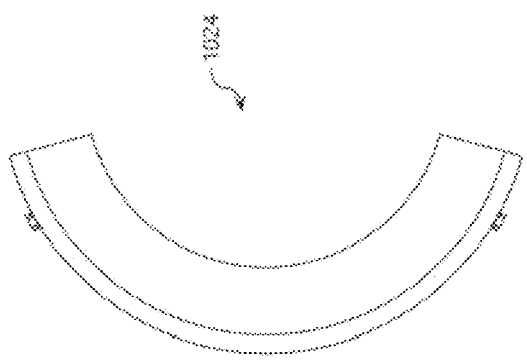
Figure 19B:
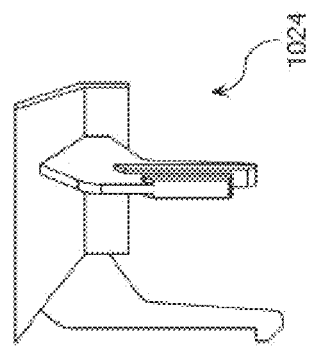
Figure 19C:
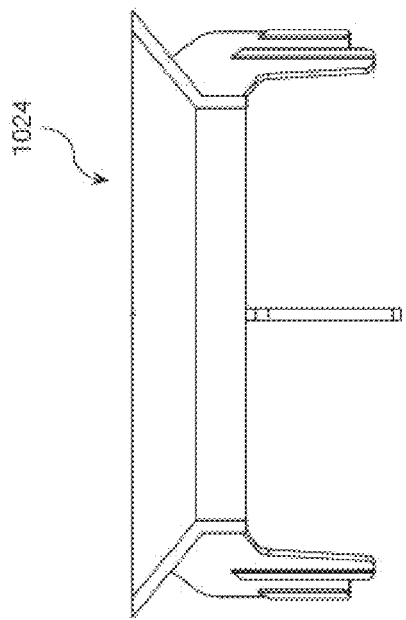
Figure 20A:
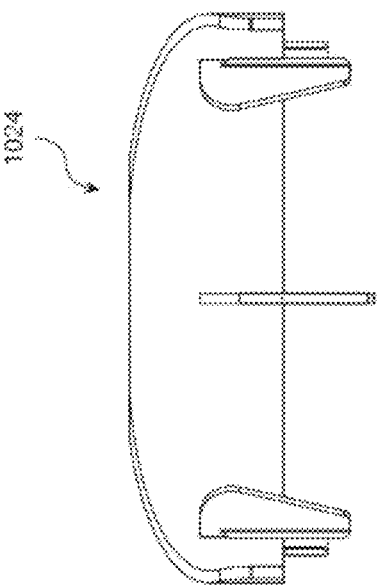
Figure 20B:
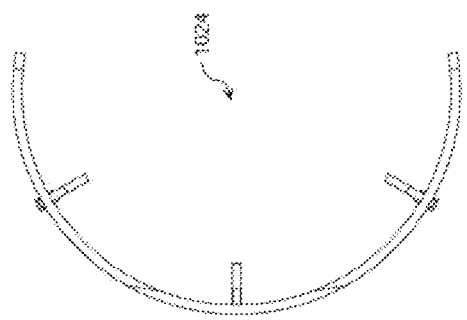
Figure 20C:
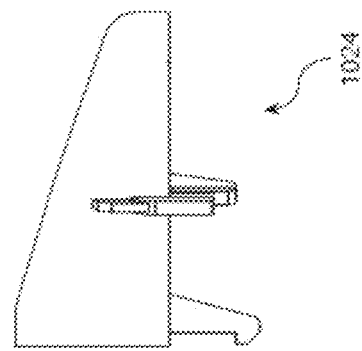
Figure 22C:
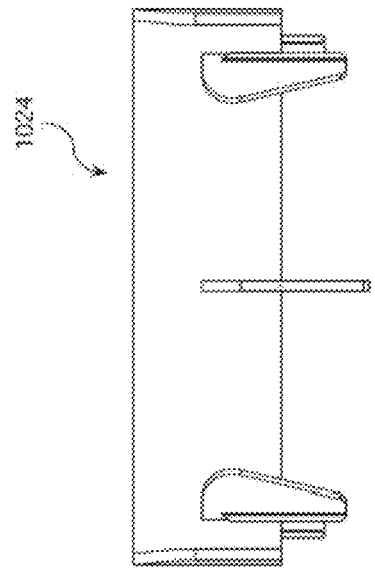
Figure 22A:
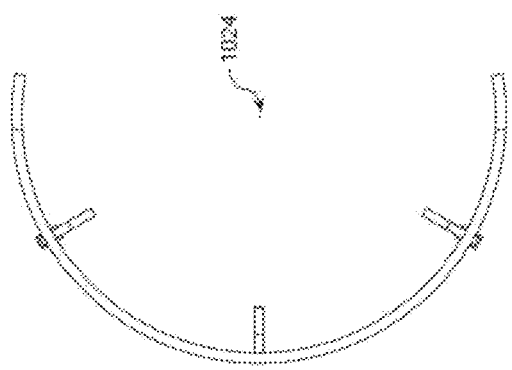
Figure 22B:
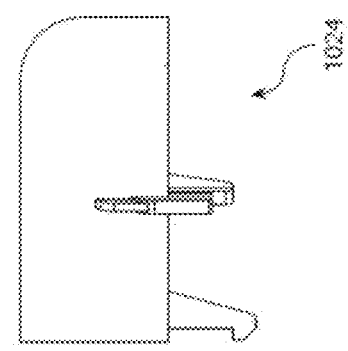

FIGS. 18A-B show cross-sectional view of the diffusing vent assembly 1000, both in an assembled state and a disassembled state. As shown in FIGS. 18A-B, the diffuser base 1010 and the diffusing head 1020 may further comprise complementary rotational securement members 1021 that may permit rotation of the diffusing head 1020 relative to the diffuser base 1010. As is clearly illustrated in FIGS. 18A and 18B, the complimentary rotational securement members of the diffusing head are a plurality of locking tabs around the circumference of the diffusing head. The complementary rotational securement members 1021 may permit rotation about a rotational axis of the diffusing head 1020 and fix the diffusing head 1020 to the diffuser base 1010 along the rotational axis of the diffusing head 1020. The air blade 1022 of the diffusing head 1020 may extend through the collar 1015 of the diffuser base 1010.

Referring now to FIGS. 15 and 16C, the ductwork fixation channel 1018 of the diffuser base 1010 may form an outwardly-oriented circumferential gap about the outside periphery of the collar 1015. A first receiving ring 1014 and a second receiving ring 1016 may extend radially from the collar 1015 and may form the ductwork fixation channel 1018. In some embodiments, the first receiving ring 1014 and the second receiving ring 1016 may be continuous. In other embodiments, the first receiving ring 1014 and second receiving ring 1016 may alternatively be discontinuous (e.g., a plurality of tabs, spokes, or other extensions extending radially from the collar 1015). In yet other embodiments, the first receiving ring 1014 and the second receiving ring 1016 may be a combination of continuous and discontinuous. The ductwork fixation channel 1018 may define a constant height, as illustrated, or may gradually taper to define a decreasing height in a decreasing radial direction. With or without the taper, the engagement of the material of the supply duct 1030 in the ductwork fixation channel 1018 may create an airtight, or nearly airtight, seal between the supply duct 1030 and the diffuser base 1010.

In this manner, the ductwork fixation channel 1018 may be able to engage a similarly sized and shaped opening in the supply duct 1030 to fix a position of the diffuser base 1010 relative to the supply duct 1030. That is, the first receiving ring 1014 may be positioned to engage an interior surface of a supply duct 1030 and the second receiving ring 1016 may be positioned to engage an exterior surface of the supply duct 1030 to fix a position of the diffuser base 1010 relative to a supply duct 1030. It is contemplated that additional measures may be used to fix the position of the diffuser base 1010 relative to the supply duct 1030 or ceiling board 1040. For example, the position of the diffuser base 1010 may be fixed relative to the supply duct 1030 or ceiling board 1040 using any conventional or yet to be developed fastener 1012 (e.g., a screw, nail, tack, or the like) or adhesive (e.g., a glue, rubber cement, epoxy, urethanes, or the like).

Still referring to FIGS. 15 and 16C, the first receiving ring 1014 of the diffuser base 1010 may also comprise a chamfer 1019 oriented for supply duct 1030 engagement prior to supply duct 1030 fixation in the ductwork fixation channel 1018. In this manner, the first receiving ring 1014 may be urged through a slightly smaller circumferential opening in the supply duct 1030, by initiating contact with the supply duct 1030 along the surface of the chamfer 1019. Once the supply duct 1030 material forming the supply duct 1030 opening passes over the chamfer 1019 it will be received within the ductwork fixation channel 1018 of the diffuser base 1010, between the first receiving ring 1014 and second receiving ring 1016. The chamfer 1019 of the first receiving ring 1014 may also comprise gussets 1017 to provide resiliency to the diffuser base 1010. As shown in greater detail in FIG. 16B, the gussets 1017 of the first receiving ring 1014 minimize the amount of material necessary to form the diffusing vent assembly 1000 and may increase the aforementioned pliability and resiliency of the first receiving ring 1014, and therefore the flexibility of the diffuser base 1010 as a whole.

Moreover, the diffusing head 1020 may comprise a diffuser vane configuration. The diffuser vane configuration may comprise a plurality of support legs 1028 extending laterally from the rotational flange 1023 of the diffusing head 1020. The plurality of support legs 1028 may support an air fin 1026, a center disk 1024, or both. The air fin 1026, which may be formed from multiple pieces or a single element, is designed to interact with the center disk 1024, to create a uniform and omnidirectional flow of air from the supply duct 1030 to the interior of the RV via the diffusing head 1020. The annular gaps between the air fin 1026 and the center disk 1024 and between the air fin 1026 and the rotational flange 1023 of the diffusing head 1020 may help achieve the desired omnidirectional flow of air.

The collar 1015, air blade 1022, and the diffuser vane configuration also cooperate to obstruct the view of any unsightly portions of the duct work or vent assembly from the interior of the vehicle. Moreover, due to its ability to rotate freely within the diffuser base 1010, the diffusing head 1020 allows a user to direct the omnidirectional flow of air. In embodiments, the air blade 1022 is most effective at distributing air through the diffusing head 1020 when it is oriented against the direction of the airflow in the supply duct 1030, as is illustrated in FIG. 9. As shown in FIG. 10, the shape of the diffusing vent assembly 1000 and the air blade 1022 are capable of producing omnidirectional airflow 1050, which allows the air to run along the ceiling board 1040. The omnidirectional airflow 1050 then gradually falls as it diffuses into the interior of the RV in a uniform fashion. In some embodiments, the omnidirectional airflow 1050 may extend along the ceiling board 1040 for about 2 feet before it starts to fall into the interior of the RV.

The air blade 1022 further gives a user the ability to adjust the amount of air flowing from the AC unit 900 into the interior of the RV by rotating the diffusing head 1020 to a desired configuration.

As is clearly illustrated in FIGS. 12 and 13, only an extended portion 1022' of the air blade 1022 extends into and is visible in the supply duct 1030. As is further clearly illustrated in FIGS. 12-15, 17A, 17B, 17C, 18A, and 18B, the air blade 1022 and, consequently, the extended portion 1022' of the air blade 1022 occupy only a partial circumferential portion of the diffusing head 1020. This extended portion 1022', which is also illustrated in FIGS. 14, 15, 17C and 18B is an integral part of the diffusing head 1020 and, as is noted above, the air blade 1022 rotates with the rest of the diffusing head 1020. It is contemplated, however, that the extended portion 1022' of the diffusing head 1020 may be provided as a separate piece, which would be securable to the remainder of the diffusing head 1020 to rotate therewith. For example, referring to FIGS. 19-22, a variety of separate extended air blade portions are illustrated. These extended air blade portions are configured for convenient snap-fit engagement with the remainder of the diffusing head 1020, although a variety of alternative means of engagement and securement are contemplated.

Referring collectively to FIGS. 13-15, installing the diffusing vent assembly 1000 may include inserting the collar 1015 of the diffuser base 1010 through an opening in the ceiling board 1040 and inserting at least a portion of the collar 1015 of the diffuser base 1010 through the opening in the supply duct 1030 corresponding to the opening in the ceiling board 1040. Installing the diffusing vent assembly 1000 may also include engaging the ductwork fixation channel 1018 formed about the outside periphery of the collar 1015 of the diffuser base 1010 with the supply duct 1030 such that the ductwork fixation channel 1018 complements the opening in the supply duct 1030. Once the diffuser base 1010 is installed, installing the diffusing vent assembly 1000 may include inserting the diffusing head 1020 into the diffuser base 1010 and securing the diffusing head 1020 and the diffuser base 1010 together using the complimentary rotational securement members. The installation process of the diffusing vent assembly 1000 is described below in greater detail. Installing the diffusing vent assembly 1000 may further comprise securing the diffuser base 1010 to the ceiling board 1040. The diffuser base 1010 may be secured to the ceiling board 1040 by a fastener 1012, an adhesive, or combinations of these. Once the diffusing head 1020 is installed in the diffuser base 1010, installing the diffusing vent assembly 1000 may further comprise rotating the diffusing head 1020 within the diffuser base 1010 while the diffusing head 1020 is secured to the diffuser base 1010.

To install the diffusing vent assembly 1000 in the RV ceiling, the first receiving ring 1014 and the second receiving ring 1016 of the diffuser base 1010 may be inserted through an opening in the ceiling board 1040. Then, the first receiving ring 1014 may be inserted through a corresponding circular opening in the supply duct 1030. In this manner, the first receiving ring 1014 may be engaged with the interior surface of the supply duct 1030 and the second receiving ring 1016 may be engaged with the exterior surface of the supply duct 1030, leaving the material of the supply duct 1030 wall sandwiched between the ductwork fixation channel 1018. This configuration may create an airtight, or nearly airtight, seal between the first receiving ring 1014 and second receiving ring 1016 and the material of the supply duct 1030. It is contemplated that the material of the supply duct 1030 may also engage an outside diameter of the ductwork fixation channel 1018 for further sealing. In embodiments, the thickness of the material of the supply duct 1030 may be slightly smaller than the height of the ductwork fixation channel 1018. For example, in one embodiment, the supply duct 1030 wall thickness may be about 0.20 inches, while the ductwork fixation channel 1018 has a corresponding height of about 0.22 inches. In other embodiments, the ductwork fixation channel 1018 may have a height that is equal to the thickness of the material of the supply duct 1030.

In embodiments, the inner diameter of the opening in the ceiling board 1040 may be smaller than the outer diameter of the first receiving ring 1014. As such, the diffusing vent assembly 1000, and any of its components, may be formed from a pliable and resilient material so that it can be manipulated through the circular opening in the ceiling board 1040. Moreover, because the inner diameter of the aforementioned opening in the supply duct 1030 may be smaller than the outside diameter of the first receiving ring 1014, the material of the supply duct 1030 may need to be manipulated over the first receiving ring 1014 into the ductwork fixation channel 118 between the first receiving ring 1014 and the second receiving ring 1016 as the diffuser base 1010 is inserted through the circular opening in the supply duct 1030. The diffuser base 1010 may be large enough to allow an installer to reach through the diffuser base 1010 and into the interior of the supply duct 1030 to manipulate the material of the supply duct 1030 over the first receiving ring 1014 into the ductwork fixation channel 118 between the first receiving ring 1014 and the second receiving ring 1016. This process may be enhanced by providing gussets 1017, as previously discussed, on the first receiving ring 1014 and by ensuring that the material of the supply duct 1030 is manipulable but resilient enough to return to its original size and shape after it has been manipulated to fit over the first receiving ring 1014. The material and construction of the diffuser base 1010 may also be selected and designed to be similarly manipulable and resilient, to further aid the installation process.

The diffuser base 1010 may be constructed from a material that is more flexible than the diffusing head 1020. Said differently, the diffusing head 1020 may be constructed from a material that is more rigid than the diffuser base 1010. This is not to imply that the diffuser base 1010 is not as strong as the diffusing head 1020, but merely describes the flexibility and rigidity of the diffuser base 1010 and the diffusing head 1020 of the diffusing vent assembly 1000. In embodiments, the Young's modulus of the diffusing head 1020 may be greater than the Young's modulus of the diffuser base 1010. The diffuser base 1010 may comprise a combination of polypropylene and thermoplastic elastomer (TPE). As will be appreciated by those skilled in the art, TPE may refer to a class of copolymers or a physical mix of polymers that consist of materials with both thermoplastic and elastomeric properties. In embodiments, the diffuser base 1010 may comprise from 40 weight percent (wt. %) to 70 wt. % polypropylene and from 30 wt. % to 60 wt. % TPE, such as 55 wt. % polypropylene and 45 wt. % TPE. The diffusing head 1020 may comprise high impact polystyrene. As will be appreciated by those skilled in the art, high impact polystyrene may be a polystyrene resin suitable for lower heat application.

As previously mentioned, once the diffusing vent assembly 1000 has been completely installed, the diffusing head 1020 is capable of 360° rotation within the diffuser base 1010. Although the diffusing head 1020 is designed to be rotated manually, motorized or other automated rotation is also contemplated in the scope of the present disclosure. When the diffusing head 1020 is rotated, so is the air blade 1022. Through this rotational control, the air blade 1022 can be used to regulate the flow, i.e., the volume, of conditioned air as it travels from the supply duct 1030, through the diffusing vent assembly 1000, and ultimately into the interior of the RV.

When installed, the diffusing vent assembly 1000 may further comprise an AC unit 900 in fluid communication with a supply duct 1030 assembly and the diffusing vent assembly 1000. As previously described, the diffuser vane configuration may comprise a plurality of support legs 1028 extending laterally from the rotational flange 1023. The plurality of support legs 1028 support an air fin 1026, a center disk 1024, or both. The diffusing vent assembly 1000 and the supply duct 1030 assembly may be configured such that in-duct conditioned air 950 may contact the air blade 1022 of the diffusing head 1020 and may be redirected to the diffuser vane configuration of the diffusing head 1020. The in-duct conditioned air 950 may contact the center disk 1024 of the diffusing head 1020 and may be redirected to the air fin 1026 and diffuser vanes. The air fin 1026 and diffuser vanes may create omnidirectional flow of the air out of the diffusing vent assembly 1000 along the ceiling board 1040.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially," "about" and "approximately" are utilized herein to represent the inherent degree of uncertainty that may be attributed to any quantitative comparison, value, measurement, or other representation. The terms "substantially," "about" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A diffusing vent assembly comprising a diffuser base and a diffusing head, wherein:
   the diffuser base comprises a mounting flange, a collar extending from the mounting flange, and a ductwork fixation channel formed about an outside periphery of the collar;
   the collar of the diffuser base defines a collar extension length c between the mounting flange and the ductwork fixation channel of the diffuser base;
   the collar extension length c is large enough to span an infra-ceiling space of a recreational vehicle;
   the diffusing head comprises a diffuser vane configuration, a rotational flange surrounding the diffuser vane configuration, and an air blade extending from the rotational flange;
   the air blade comprises a terminal edge and defines an air blade extension length b between the rotational flange of the diffusing head and the terminal edge of the air blade;
   the air blade extension length b is greater than the collar extension length c; and
   the diffuser base and the diffusing head further comprise complementary rotational securement members that permit rotation of the diffusing head relative to the diffuser base about a rotational axis of the diffusing head, and fix the diffusing head to the diffuser base along the rotational axis of the diffusing head, with the air blade of the diffusing head extending through the collar of the diffuser base such that an extended portion of the air blade rotates with the diffusing head and is visible in a supply duct held in the ductwork fixation channel of the diffuser base to regulate the flow of a volume of conditioned air as it travels from the supply duct through the diffusing vent assembly.

2. The diffusing vent assembly of claim 1, wherein the ductwork fixation channel of the diffuser base forms an outwardly-oriented circumferential gap about the outside periphery of the collar.

3. The diffusing vent assembly of claim 1, wherein the mounting flange of the diffuser base extends radially from the collar of the diffuser base.

4. The diffusing vent assembly of claim 1, wherein the diffuser base further comprises a first receiving ring and a second receiving ring extending radially from the collar and forming the ductwork fixation channel.

5. The diffusing vent assembly of claim 4, wherein the first receiving ring is positioned to engage an interior surface of a supply duct and the second receiving ring is positioned to engage an exterior surface of the supply duct to fix a position of the diffuser base relative to a supply duct.

6. The diffusing vent assembly of claim 4, wherein the first receiving ring of the diffuser base further comprises a chamfer oriented for supply duct engagement prior to supply duct fixation in the ductwork fixation channel.

7. The diffusing vent assembly of claim 6, wherein the chamfer of the first receiving ring further comprises gussets to provide resiliency to the diffuser base.

8. The diffusing vent assembly of claim 4, wherein the first receiving ring and the second receiving ring are continuous.

9. The diffusing vent assembly of claim 1, wherein the Young's modulus of the diffusing head is greater than the Young's modulus of the diffuser base.

10. The diffusing vent assembly of claim 1, wherein the diffuser base comprises polypropylene and thermoplastic elastomer.

11. The diffusing vent assembly of claim 1, wherein the diffuser base comprises from 40 weight percent to 70 weight percent polypropylene and from 30 weight percent to 60 weight percent thermoplastic elastomer.

12. The diffusing vent assembly of claim 1, wherein the diffuser vane configuration comprises a plurality of support legs extending laterally from the rotational flange.

13. The diffusing vent assembly of claim 12, wherein the plurality of support legs support an air fin, a center disk, or both.

14. The diffusing vent assembly of claim 1, wherein the complimentary rotational securement members of the diffusing head are a plurality of locking tabs around the circumference of the diffusing head that engage the diffuser flange of the diffuser base.

15. The diffusing vent assembly of claim 1 wherein the diffusing vent assembly is configured such that in-duct conditioned air in a supply duct held in the ductwork fixation channel of the diffuser base contacts the air blade of the diffusing head and is redirected to the diffuser vane configuration of the diffusing head.

16. The diffusing vent assembly of claim 1, wherein:
the terminal edge of the air blade slopes bi-directionally away from a maximum point of extension along a circumferential path about a rotational axis A of the diffusing head; and
the air blade and an extended portion of the air blade occupy a partial circumferential portion of the diffusing head.

17. A recreational vehicle comprising supply ductwork and a diffusing vent assembly, the diffusing vent assembly comprising a diffuser base and a diffusing head, wherein:
the supply ductwork and diffusing vent assembly is positioned in an infra-ceiling space of the recreational vehicle;
the diffusing vent assembly is in communication with the supply ductwork;
the diffuser base comprises a mounting flange, a collar extending from the mounting flange, and a ductwork fixation channel formed about an outside periphery of the collar;
the collar of the diffuser base defines a collar extension length c between the mounting flange and the ductwork fixation channel of the diffuser base;
the collar extension length c is large enough to span the infra-ceiling space of a recreational vehicle;
the diffusing head comprises a diffuser vane configuration, a rotational flange surrounding the diffuser vane configuration, and an air blade extending from the rotational flange;
the air blade comprises a terminal edge and defines an air blade extension length b between the rotational flange of the diffusing head and the terminal edge of the air blade;
the air blade extension length b is greater than the collar extension length c; and
the diffuser base and the diffusing head further comprise complementary rotational securement members that permit rotation of the diffusing head relative to the diffuser base about a rotational axis of the diffusing head, and fix the diffusing head to the diffuser base along the rotational axis of the diffusing head, with the air blade of the diffusing head extending through the collar of the diffuser base into the supply duct such that an extended portion of the air blade rotates with the diffusing head and is visible in the supply duct to regulate the flow of a volume of conditioned air as it travels from the supply duct through the diffusing vent assembly.

18. The recreational vehicle of claim 17, further comprising an AC unit in fluid communication with a supply duct assembly and the diffusing vent assembly.

19. The recreational vehicle of claim 17, wherein the diffuser vane configuration comprises a plurality of support legs extending laterally from the rotational flange.

20. The recreational vehicle of claim 19, wherein the plurality of support legs support an air fin, a center disk, or both.

21. The recreational vehicle of claim 20, wherein the diffusing vent assembly and the supply duct assembly are configured such that:
in-duct conditioned air contacts the air blade of the diffusing head and is redirected to the diffuser vane configuration of the diffusing head; and
the in-duct conditioned air contacts the center disk of the diffusing head and is redirected to the air fin and diffuser vanes, wherein the air fin and diffuser vanes create omnidirectional flow of the air out of the diffusing vent assembly along the ceiling board.

22. The recreational vehicle of claim 17 wherein the diffusing vent assembly and the supply ductwork are configured such that in-duct conditioned air in the supply ductwork contacts the air blade of the diffusing head and is redirected to the diffuser vane configuration of the diffusing head.

23. The recreational vehicle of claim 17, wherein:
the terminal edge slopes bi-directionally away from a maximum point of extension along a circumferential path about a rotational axis A of the diffusing head; and
the air blade and an extended portion of the air blade occupy a partial circumferential portion of the diffusing head.

24. A diffusing vent assembly comprising a diffuser base and a diffusing head, wherein: the diffuser base comprises a mounting flange and a collar extending from the mounting flange; the collar of the diffuser base defines a collar extension length c from the mounting flange; the collar extension length c is large enough to span an infra-ceiling space of a recreational vehicle; the diffusing head comprises a diffuser vane configuration, a rotational flange surrounding the diffuser vane configuration, and an air blade extending from the rotational flange; the air blade comprises a terminal edge and defines an air blade extension length b between the rotational flange of the diffusing head and the terminal edge of the air blade; a portion of the air blade extension length b is greater than the collar extension length c; and the diffuser base and the diffusing head further comprise complementary rotational securement members that fix the diffusing head to the diffuser base along a rotational axis of the diffusing head while permitting rotation of the diffusing head relative to the diffuser base about the rotational axis of the diffusing head, such that an extended portion of the air blade rotates with the diffusing head and regulates the flow of a volume of conditioned air as it travels from a supply duct held in a ductwork fixation channel of the diffuser base through the diffusing vent assembly.

\* \* \* \* \*

UNITED STATES PATENT AND TRADEMARK OFFICE
CERTIFICATE OF CORRECTION

PATENT NO. : 11,760,158 B2  
APPLICATION NO. : 17/064204  
DATED : September 19, 2023  
INVENTOR(S) : Jeff Snyder et al.

Page 1 of 1

It is certified that error appears in the above-identified patent and that said Letters Patent is hereby corrected as shown below:

On the Title Page

Column 1, Item (73), Assignee, delete "Keystone RV Company, Goshen, IN (US)" and insert --Thor Tech, Inc., Elkhart, IN (US)--, therefor.

In the Claims

In Column 16, Line 33, Claim 22, after "claim 17", insert --,--.

Signed and Sealed this  
Sixteenth Day of April, 2024

Katherine Kelly Vidal  
*Director of the United States Patent and Trademark Office*